US011755835B2

(12) United States Patent
Zheng et al.

(10) Patent No.: US 11,755,835 B2
(45) Date of Patent: *Sep. 12, 2023

(54) METHOD AND APPARATUS FOR DISPLAYING CANDIDATE WORD, AND GRAPHICAL USER INTERFACE

(71) Applicant: Honor Device Co., Ltd., Shenzhen (CN)

(72) Inventors: Weibin Zheng, Shenzhen (CN); Yue Zhang, Nanjing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 371 days.

This patent is subject to a terminal disclaimer.

(21) Appl. No.: 17/144,149

(22) Filed: Jan. 8, 2021

(65) Prior Publication Data

US 2021/0224477 A1 Jul. 22, 2021

Related U.S. Application Data

(63) Continuation of application No. 16/313,010, filed as application No. PCT/CN2016/086786 on Jun. 22, 2016, now Pat. No. 11,010,551.

(51) Int. Cl.
*G06F 40/00* (2020.01)
*G06F 40/274* (2020.01)
(Continued)

(52) U.S. Cl.
CPC .......... *G06F 40/274* (2020.01); *G06F 3/0237* (2013.01); *G06F 3/048* (2013.01); *G06F 3/04886* (2013.01); *G06N 20/00* (2019.01)

(58) Field of Classification Search
CPC .. G06F 40/166; G06F 3/04842; G06F 40/274; G06F 3/0237; G06F 3/04886;
(Continued)

(56) References Cited

U.S. PATENT DOCUMENTS 6,275,789 B1 8/2001 Moser et al.
6,307,549 B1 10/2001 King et al.
(Continued)

FOREIGN PATENT DOCUMENTS

CN 101727201 A 6/2010
CN 101916158 A 12/2010
(Continued)

OTHER PUBLICATIONS

Gunarathne et al., "Intellemo: A mobile instant messaging application with intelligent emotion identification," 2013 IEEE 8th International Conference on Industrial and Information Systems, Peradeniya, Sri Lanka, 2013, pp. 627-632. (Year: 2013).*
(Continued)

*Primary Examiner* — Edgar X Guerra-Erazo
(74) *Attorney, Agent, or Firm* — Conley Rose, P.C.

(57) ABSTRACT

Embodiments of the present invention relate to the field of terminal technologies, and provide a method and an apparatus for displaying a candidate word, and a graphical user interface to improve efficiency of a user in entering information by using an input method. The method is applied to a scenario in which a user enters information by using an input method. The method includes: determining a type of an application that invokes the input method; determining, according to the type, dimension information corresponding to the type; determining, according to the dimension information, a lexicon corresponding to the dimension information; and displaying, in a default candidate option area of the input method, at least one candidate word that is in the lexicon and meets a preset condition.

20 Claims, 10 Drawing Sheets

(51) Int. Cl.
*G06F 3/048* (2013.01)
*G06F 3/023* (2006.01)
*G06F 3/04886* (2022.01)
*G06N 20/00* (2019.01)

(58) Field of Classification Search
CPC .... G06F 3/0236; G06F 40/279; G06F 40/232; G06F 3/167; G06F 3/04817; G06F 16/3329; G06F 3/0488; G06F 40/20; G06F 40/205; G06F 3/016; G06F 3/04847; G06F 9/451; G06F 16/3322; G06F 3/048; G06F 3/04883; G06F 3/04897; G06F 3/04895; G06F 40/263; G06F 3/0233; G10L 15/22; G10L 15/005; G10L 15/02; G10L 15/26
See application file for complete search history.

(56) References Cited

U.S. PATENT DOCUMENTS

| | | | |
|---|---|---|---|
| 6,631,501 | B1 | 10/2003 | Jurion et al. |
| 6,829,759 | B1 | 12/2004 | Davis et al. |
| 7,286,115 | B2 | 10/2007 | Longe et al. |
| 7,698,326 | B2 | 4/2010 | Thorn |
| 11,010,551 | B2* | 5/2021 | Zheng .................. G06F 40/274 |
| 11,449,166 | B2* | 9/2022 | Yi ....................... G06F 3/04886 |
| 2001/0029455 | A1 | 10/2001 | Chin et al. |
| 2006/0010395 | A1 | 1/2006 | Aalton en |
| 2007/0152978 | A1 | 7/2007 | Kocienda et al. |
| 2011/0061017 | A1 | 3/2011 | Ullrich et al. |
| 2013/0046544 | A1 | 2/2013 | Kay et al. |
| 2013/0159920 | A1 | 6/2013 | Scott et al. |
| 2013/0234947 | A1 | 9/2013 | Kristensson et al. |
| 2014/0163954 | A1 | 6/2014 | Joshi et al. |
| 2014/0237356 | A1 | 8/2014 | Durga et al. |
| 2014/0267045 | A1 | 9/2014 | Grieves et al. |
| 2014/0337438 | A1* | 11/2014 | Govande ............... H04L 51/063 709/206 |
| 2015/0043824 | A1 | 2/2015 | Akhavan Fomani et al. |
| 2015/0350118 | A1* | 12/2015 | Yang ....................... H04L 51/02 715/752 |
| 2016/0359771 | A1* | 12/2016 | Sridhar .................. H04L 51/02 |
| 2019/0220511 | A1* | 7/2019 | Zheng ..................... G06F 3/048 |
| 2019/0294257 | A1* | 9/2019 | Chen ..................... G06F 3/0237 |

FOREIGN PATENT DOCUMENTS

| | | |
|---|---|---|
| CN | 102222021 A | 10/2011 |
| CN | 102385621 A | 3/2012 |
| CN | 102611796 A | 7/2012 |
| CN | 103235677 A | 8/2013 |
| CN | 103645851 A | 3/2014 |
| CN | 104317851 A | 1/2015 |
| CN | 303439267 S | 11/2015 |
| CN | 105117030 A | 12/2015 |
| CN | 105573515 A | 5/2016 |
| CN | 105573615 A | 5/2016 |
| CN | 103076946 B | 2/2017 |
| CN | 106896932 A | 6/2017 |
| EP | 1724692 A2 | 11/2006 |
| KR | 101110501 B1 | 2/2012 |
| KR | 101174216 B1 | 8/2012 |
| KR | 101385210 B1 | 4/2014 |
| KR | 20140089751 A | 7/2014 |
| KR | 101583181 B1 | 1/2016 |
| RU | 2007101283 A | 8/2008 |
| RU | 2009124451 A | 1/2011 |
| RU | 2424547 C2 | 7/2011 |
| WO | 2014183655 A1 | 11/2014 |

OTHER PUBLICATIONS

Ostrem, J., "Palm OS User Interface Guidelines", by 'PalmSource, Inc.', Retrieved from the Internet: https://www.cs.uml.edu/~fredm/courses/91.308-spr05/files/palmdocs/uiguidelines.pdf, published 2003, 186 pages.

Anonymous: "AutoComPaste: Auto-Completing Text as an Alternative to Copy-Paste Shen"s Personal Website", dated Jan. 1, 2012, total 14 pages. (Cited from Parent Application).

* cited by examiner

METHOD AND APPARATUS FOR DISPLAYING CANDIDATE WORD, AND GRAPHICAL USER INTERFACE

CROSS-REFERENCE TO RELATED APPLICATIONS

This application is a continuation of U.S. patent application Ser. No. 16/313,010, filed on Dec. 22, 2018, which is a national stage of International Application No. PCT/CN2016/086786, filed on Jun. 22, 2016. All of the aforementioned patent applications are hereby incorporated by reference in their entireties.

TECHNICAL FIELD

The present invention relates to the field of terminal technologies, and in particular, to a method and an apparatus for displaying a candidate word, and a graphical user interface.

BACKGROUND

With continuous development of terminal technologies, intelligent terminals are applied more widely. On an intelligent terminal, most information is entered by using an input method. Therefore, the input method becomes an essential application on the intelligent terminal, and improving efficiency of a user in entering information by using the input method also becomes a problem to be resolved urgently.

Generally, to improve efficiency of a user in entering information by using an input method, when the user enters information by using the input method, a display interface of the input method provides a candidate option area for the user. The candidate option area includes some candidate options recommended by the input method to the user. Before the user starts to enter information, the candidate option area is referred to as a default candidate option area. FIGS. 1 (a) and FIG. 1 (b) are schematic diagrams of default candidate option areas provided by two input methods respectively. In FIG. 1 (a), default candidate option area A provided by an input method includes a toolbar of the input method, for example, an emoticon and setting of the input method. In FIG. 1 (b), default candidate option area A provided by an input method includes some words that are frequently entered by most users according to statistics of the input method.

In FIG. 1 (a), the default candidate option area provided by the input method can recommend only the toolbar of the input method to the user, but the toolbar of the input method is not used frequently. In FIG. 1 (b), the default candidate option area provided by the input method can recommend only the words frequently entered by most users to the user, but this may not be applicable to individual users. Therefore, the default candidate option areas provided by the two input methods are not helpful for improving efficiency of the user in entering information by using the input methods.

SUMMARY

This application provides a method and an apparatus for displaying a candidate word, and a graphical user interface to improve efficiency of a user in entering information by using an input method.

To achieve the foregoing objective, the following technical solutions are used in this application:

According to a first aspect, a graphical user interface on a computer device is provided, where the computer device has a display, a touch-sensitive surface, a memory, and one or more processors configured to execute one or more programs stored in the memory, and the graphical user interface includes an application interface, an input box, and an input method interface, where in response to detecting that a user triggers a first application, an application interface and a first input box of the first application are displayed; in response to detecting that the user selects the first input box, a first input method interface is displayed, where a default candidate option area of the first input method interface includes a first group of default candidate words; in response to detecting that the user triggers a second application, an application interface and a second input box of the second application are displayed; when in response to detecting that the user selects the second input box, a second input method interface is displayed, where a default candidate option area of the second input method interface includes a second group of default candidate words; and the first application and the second application are different applications, and the first group of default candidate words and the second group of default candidate words include different candidate words.

In an optional implementation of the first aspect, a type of the first application is a chat type, a map type, a commodity type, an audio/video type, or an application market type; and a type of the second application is the chat type, the map type, the commodity type, the audio/video type, or the application market type.

In another optional implementation of the first aspect, the first group of default candidate words is updated content in a clipboard; and/or the second group of default candidate words is updated content in a clipboard.

On the graphical user interface provided by this application, when the user triggers different applications, because input method interfaces displayed when input boxes on different application interfaces are selected may include different default candidate words, it may be ensured to some extent that the default candidate words may be words that the user needs to enter in an input box; and further, the default candidate words are displayed in a default candidate option area of the input method. This can improve efficiency of the user in entering information by using the input method.

According to a second aspect, a graphical user interface on a computer device is provided, where the computer device has a display, a touch-sensitive surface, a memory, and one or more processors configured to execute one or more programs stored in the memory, and the graphical user interface includes an application interface, an input box, and an input method interface, where in response to detecting that a user triggers content copying, copied content is selected and displayed; in response to detecting that the user triggers an application, an application interface and an input box of the application are displayed; and in response to detecting that the user selects the input box, an input method interface is displayed, where a default candidate option area of the input method interface includes a group of default candidate words, and the group of default candidate words is the copied content.

On the graphical user interface provided by this application, after the user triggers an intelligent terminal to copy a piece of content, the user may continue to trigger the intelligent terminal to paste the copied content. Therefore, in this application, after the user triggers the intelligent terminal to perform copying, when the user triggers an application, because an input method interface displayed when an input box on an application interface of the application is selected may include the content that the user triggers the intelligent terminal to copy, the content that the user triggers the intelligent terminal to copy is displayed in a default candidate option area of the input method. This can improve efficiency of the user in entering information by using the input method.

According to a third aspect, a method for displaying a candidate word is provided, where the method is applied to a scenario in which a user enters information by using an input method, and the method includes: determining a type of an application that invokes the input method; determining, according to the type, dimension information corresponding to the type; determining, according to the dimension information, a lexicon corresponding to the dimension information; and displaying, in a default candidate option area of the input method, at least one candidate word that is in the lexicon and meets a preset condition.

In the method for displaying a candidate word according to this application, when the candidate word is displayed in the default candidate option area of the input method, reference may be made to an application scenario of the input method, that is, by which type of application the input method is invoked, then the corresponding dimension information is determined according to the type of the application, and the lexicon corresponding to the dimension information is determined, that is, the lexicon is a lexicon that matches the application scenario of the input method. Therefore, it may be ensured to some extent that candidate words determined from the lexicon may be words that the user needs to enter, and further, the candidate words are displayed in the default candidate option area of the input method. This can improve efficiency of the user in entering information by using the input method.

In an optional implementation of the third aspect, the determining, according to the type, dimension information corresponding to the type may include: determining, according to the type and a preset correspondence set, the dimension information corresponding to the type, where the correspondence set includes a correspondence between the type and the dimension information.

For example, the type of the application may include a chat type, a map type, a commodity type, an audio/video type, or an application market type. Dimension information corresponding to the types may be specifically as follows: Dimension information corresponding to the chat type may be a date dimension, or a date dimension and a chat object dimension; dimension information corresponding to the map type may be a historical record dimension; and dimension information corresponding to the commodity type, the audio/video type, or the application market type may be a historical record dimension and/or a search popularity dimension.

In another optional implementation of the third aspect, before the determining a type of an application that invokes the input method, the method for displaying a candidate option according to this application may further include: determining that content in a clipboard is updated; and displaying, in the default candidate option area of the input method, updated content in the clipboard as the at least one candidate word.

When the user triggers a copying process, the user may need to use the input method to paste copied content. Therefore, in the method for displaying a candidate word according to this application, the candidate word displayed in the default candidate option area of the input method may be determined according to whether the content in the clipboard is updated. That is, if the content in the clipboard is updated, the updated content in the clipboard may be displayed in the default candidate option area of the input method (that is, the updated content in the clipboard is displayed as the at least one candidate word in the default candidate option area of the input method). Therefore, efficiency of the user in entering information by using the input method can be further improved.

According to a fourth aspect, a method for displaying a candidate word is provided, where the method is applied to a scenario in which a user enters information by using an input method, and the method includes: determining that content in a clipboard is updated; and displaying, in a default candidate option area of the input method, updated content in the clipboard as at least one candidate word.

After the user copies a piece of content, the user may paste the copied content. Therefore, in this application, if it is determined that the content in the clipboard is updated, the updated content in the clipboard may be displayed in the default candidate option area of the input method (that is, the updated content in the clipboard is displayed as the at least one candidate word in the default candidate option area of the input method). Therefore, efficiency of the user in entering information by using the input method can be improved.

According to a fifth aspect, an apparatus for displaying a candidate word is provided, where the apparatus is applied to a scenario in which a user enters information by using an input method, and the apparatus includes a lexicon selection module and a default candidate option module.

The lexicon selection module is configured to determine a type of an application that invokes the input method, determine, according to the type, dimension information corresponding to the type, and determine, according to the dimension information, a lexicon corresponding to the dimension information; and the default candidate option module is configured to display, in a default candidate option area of the input method, at least one candidate word that is in the lexicon selected by the lexicon selection module and meets a preset condition.

In an optional implementation of the fifth aspect, the lexicon selection module is specifically configured to determine, according to the type of the application that invokes the input method and a preset correspondence set, the dimension information corresponding to the type, where the correspondence set includes a correspondence between the type and the dimension information.

In another optional implementation of the fifth aspect, the lexicon selection module is further configured to determine, before determining the type of the application that invokes the input method, that content in a clipboard is updated; and the default candidate option module is further configured to display, in the default candidate option area of the input method, updated content in the clipboard as the at least one candidate word.

For detailed descriptions about technical effects of the fifth aspect and each optional implementation of the fifth aspect, refer to the descriptions about the technical effects of the third aspect and each optional implementation of the third aspect. Details are not further described herein.

According to a sixth aspect, an apparatus for displaying a candidate word is provided, where the apparatus is applied to a scenario in which a user enters information by using an input method, and the apparatus includes a lexicon selection module and a default candidate option module.

The lexicon selection module is configured to determine that content in a clipboard is updated; and the default candidate option module is configured to display, in a default candidate option area of the input method, updated content in the clipboard as at least one candidate word according to a result determined by the lexicon selection module.

For detailed descriptions about technical effects of the sixth aspect, refer to the descriptions about the technical effects of the fourth aspect. Details are not further described herein.

In the third aspect to the sixth aspect, one lexicon uniquely corresponds to one piece of dimension information.

For example, the date dimension uniquely corresponds to the date lexicon; the chat object dimension uniquely corresponds to the chat object lexicon; the historical record dimension uniquely corresponds to the historical record lexicon; and the search popularity dimension uniquely corresponds to the search popularity lexicon.

In this application, if the dimension information corresponding to the type of the application that invokes the input method is the date dimension, the candidate word can be determined only in the date lexicon uniquely corresponding to the date dimension; if the dimension information corresponding to the type of the application that invokes the input method is the chat object dimension, the candidate word can be determined only in the chat object lexicon uniquely corresponding to the chat object dimension; if the dimension information corresponding to the type of the application that invokes the input method is the historical record dimension, the candidate word can be determined only in the historical record lexicon uniquely corresponding to the historical record dimension; or if the dimension information corresponding to the type of the application that invokes the input method is the search popularity dimension, the candidate word can be determined only in the search popularity lexicon uniquely corresponding to the search popularity dimension. Therefore, when the input method is applied to different application scenarios, it may be ensured to some extent that candidate words determined from the corresponding lexicon may be the words that the user needs to enter, and further, the candidate words are displayed in the default candidate option area of the input method. This can further improve efficiency of the user in entering information by using the input method.

In the third aspect to the sixth aspect, the type of the application that invokes the input method is the chat type, the dimension information is the date dimension, the lexicon is the date lexicon corresponding to the date dimension, and the at least one candidate word that meets the preset condition is: at least one candidate word that is in the date lexicon and corresponds to a first date, where the first date is a date that is in the date lexicon and the same as a current date.

In the third aspect to the sixth aspect, the type of the application that invokes the input method is the chat type, the dimension information is the date dimension and the chat object dimension, the lexicon is the date lexicon corresponding to the date dimension and the chat object lexicon corresponding to the chat object dimension, and the at least one candidate word that meets the preset condition is: at least one candidate word that is in the date lexicon and corresponds to a first date, where the first date is a date that is in the date lexicon and the same as a current date, a binding relationship exists between the first date and a first relationship, and a relationship between the user and an object currently chatting with the user is the first relationship in the chat object lexicon.

In the third aspect to the sixth aspect, the type of the application that invokes the input method is the map type, the dimension information is the historical record dimension, the lexicon is the historical record lexicon corresponding to the historical record dimension, and the at least one candidate word that meets the preset condition is: at least one candidate word that is in the historical record lexicon and corresponds to first latitude and longitude and the application, where the first latitude and longitude are latitude and longitude that are in the historical record lexicon and the same as latitude and longitude of a current location of the user.

In the third aspect to the sixth aspect, the type of the application that invokes the input method is the commodity type, the audio/video type, or the application market type, the dimension information is the historical record dimension and/or the search popularity dimension, the lexicon is the historical record lexicon corresponding to the historical record dimension and the search popularity lexicon corresponding to the search popularity dimension, and the at least one candidate word that meets the preset condition is: at least one candidate word that is in the historical record lexicon and the search popularity lexicon and corresponds to the application, and whose search frequency is highest, and whose last search date is closest to a current date.

When the dimension information is the historical record dimension, the lexicon is the historical record lexicon; in this case, the at least one candidate word that meets the preset condition is: at least one candidate word that is in the historical record lexicon and corresponds to the application, and whose search frequency is highest, and whose last search date is closest to the current date. When the dimension information is the search popularity dimension, the lexicon is the search popularity lexicon; in this case, the at least one candidate word that meets the preset condition is: at least one candidate word that is in the search popularity lexicon and corresponds to the application, and whose search frequency is highest, and whose last search date is closest to the current date. When the dimension information is the historical record dimension and the search popularity dimension, the lexicon is the historical record lexicon and the search popularity lexicon; in this case, the at least one candidate word that meets the preset condition is: at least one candidate word that is in the historical record lexicon and the search popularity lexicon and corresponds to the application, and whose search frequency is highest, and whose last search date is closest to the current date.

In the third aspect to the sixth aspect, when multiple pieces of dimension information correspond to a type of an application, each of the multiple pieces of dimension information corresponds to one lexicon; in this case, according to weights preset for the multiple pieces of dimension information, several candidate words may be determined from the lexicon corresponding to each piece of dimension information. Therefore, candidate words displayed in the default candidate option area of the input method may be determined with reference to the multiple pieces of dimension information. Therefore, the determined candidate words can better meet an input requirement of the user, and efficiency of the user in entering information by using the input method may be further improved.

According to a seventh aspect, an intelligent terminal is provided, where the intelligent terminal includes at least one processor, an interface circuit, a memory, and a system bus.

The memory is configured to store a computer-executable instruction, the at least one processor, the interface circuit, and the memory are interconnected by the system bus, and when the intelligent terminal runs, the at least one processor executes the computer-executable instruction stored in the memory, so that the intelligent terminal performs the method for displaying a candidate word according to any one of the third aspect or each optional implementation of the third aspect.

According to an eighth aspect, a computer-readable storage medium is provided, where the computer-readable storage medium stores one or more programs, the one or more programs include a computer-executable instruction, and when at least one processor of an intelligent terminal executes the computer-executable instruction, the intelligent terminal performs the method for displaying a candidate word according to any one of the third aspect or each optional implementation of the third aspect.

For detailed descriptions about technical effects of the seventh aspect and the eighth aspect, refer to the descriptions about the technical effects of the third aspect. Details are not further described herein.

According to a ninth aspect, an intelligent terminal is provided, where the intelligent terminal includes at least one processor, an interface circuit, a memory, and a system bus. The memory is configured to store a computer-executable instruction, the at least one processor, the interface circuit, and the memory are interconnected by the system bus, and when the intelligent terminal runs, the at least one processor executes the computer-executable instruction stored in the memory, so that the intelligent terminal performs the method for displaying a candidate word according to any one of the fourth aspect or each optional implementation of the fourth aspect.

According to a tenth aspect, a computer-readable storage medium is provided, where the computer-readable storage medium stores one or more programs, the one or more programs include a computer-executable instruction, and when at least one processor of an intelligent terminal executes the computer-executable instruction, the intelligent terminal performs the method for displaying a candidate word according to any one of the fourth aspect or each optional implementation of the fourth aspect.

For detailed descriptions about technical effects of the ninth aspect and the tenth aspect, refer to the descriptions about the technical effects of the fourth aspect. Details are not further described herein.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention.

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists. The character "/" in this specification indicates an "or" relationship between the associated objects. For example, A/B indicates A or B.

In the specification and claims of the present invention, the term "first" is used to indicate a corresponding object but does not indicate a particular order of described objects. For example, a first date is used to indicate a corresponding date instead of describing a characteristic date sequence.

In the embodiments of the present invention, terms such as "an example" or "for example" are used to represent examples, illustrations, or explanations. Any embodiment or design solution described as "an example" or "for example" in the embodiments of the present invention shall not be interpreted to be more preferential or advantageous than other embodiments or design solutions. Specifically, the terms such as "an example" or "for example" are intended to present related concepts in a specific manner.

In descriptions of the present invention, "multiple" means two or more than two unless otherwise specified. For example, multiple pieces of dimension information are two or more than two pieces of dimension information.

The following describes the technical solutions in the embodiments of the present invention in detail with reference to the accompanying drawings in the embodiments of the present invention. Apparently, the described embodiments are merely some but not all of the embodiments of the present invention.

A method and an apparatus for displaying a candidate word, and a graphical user interface provided by the embodiments of the present invention may be applied to an intelligent terminal. In a scenario in which a user needs to enter information by using an input method, according to the method and apparatus for displaying a candidate word, and the graphical user interface provided by the embodiments of the present invention, at least one candidate word is displayed in a default candidate option area of the input method. In this way, some words that the user may need to enter are recommended to the user, and therefore, efficiency of the user in entering information by using the input method can be improved.

In the embodiments of the present invention, a candidate word may include a single character or multiple characters. For example, assuming that a language of the input method is Chinese, a candidate word may include a single Chinese character, a word formed by multiple Chinese characters, a phrase formed by multiple Chinese words, a sentence formed by multiple Chinese characters, or the like. Specifically, this may be determined according to an actual use requirement, and is not limited in the present invention.

Figure 2:
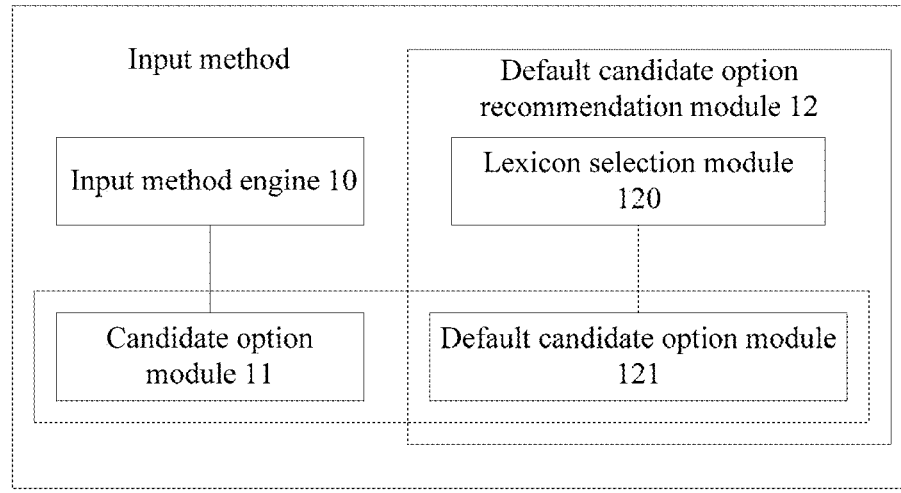
FIG. 2 is a schematic structural diagram of an input method according to an embodiment of the present invention.

As shown in FIG. 2, FIG. 2 is a schematic diagram of an implementation of an input method (also referred to as an input method application) according to an embodiment of the present invention. In FIG. 2, the input method includes an input method engine 10, a candidate option module 11, and a default candidate option recommendation module 12. The default candidate option recommendation module 12 may include a lexicon selection module 120 and a default candidate option module 121. In a specific implementation, the candidate option module 11 and the default candidate option module 121 may be two different modules, but the two different modules may be implemented by using same program code. Certainly, the candidate option module 11 and the default candidate option module 121 may also be implemented by using one module, that is, the two modules may be integrated in the implementation (as shown by a dashed line box in FIG. 2). Specifically, this may be determined according to an actual use requirement, and is not limited in the present invention.

The following describes each module of the input method shown in FIG. 2 by using examples.

The input method engine is configured to search, according to a character string (namely, a character string entered in an input text box by a user by using the input method) captured from an input text box in the input method, a lexicon (including a system lexicon and a user lexicon) for a character or a word corresponding to the character string, and transmit the character or the word to the candidate option module.

The system lexicon is a lexicon preset in the input method, namely, a default lexicon in the input method. For the user lexicon, in a process of entering information by the user by using the input method, if a character or a word entered by the user does not exist in the system lexicon, the character or the word may be stored in the user lexicon, that is, the user lexicon is a lexicon generated in the process of entering information by the user by using the input method.

The candidate option module is configured to display, in a candidate option area of the input method, the character or the word transmitted by the input method engine.

The lexicon selection module is configured to determine a type of an application that invokes the input method, determine, according to the type, dimension information corresponding to the type, determine, according to the dimension information, a lexicon corresponding to the dimension information (including a user lexicon corresponding to each piece of dimension information when there are multiple pieces of dimension information), and then search the lexicon for at least one candidate word that meets a preset condition, and transmit the at least one candidate word to the default candidate option module.

In this embodiment of the present invention, a type of an application corresponds to one or more pieces of dimension information, and one piece of dimension information uniquely corresponds to one lexicon. The lexicon corresponding to each piece of dimension information may be the system lexicon, or may be the user lexicon. Specifically, this may be determined according to an actual use requirement, and is not limited in this embodiment of the present invention.

For example, if the type of the application that invokes the input method, determined by the lexicon selection module, is a chat type (that is, the application is an application of the chat type), the dimension information corresponding to the chat type is a date dimension, or is a date dimension and a chat object dimension; and the lexicon corresponding to the date dimension is a date lexicon, and the lexicon corresponding to the chat object dimension is a chat object lexicon. The date lexicon may store each holiday and greetings corresponding to each holiday; because each holiday in a year is basically determined, the date lexicon may be the system lexicon (that is, the date lexicon may be the preset lexicon). The chat object lexicon may store a specific relationship between users that use the application and some specific users. Because the users that use the application are different, and the specific users having the specific relationship with the users are also different, the chat object lexicon may be the user lexicon (that is, the chat object lexicon may be the lexicon generated in the process of entering information by the user by using the input method).

The default candidate option module is configured to display, in the candidate option area of the input method, the at least one candidate word transmitted by the lexicon selection module, where the candidate option area is also referred to as a default candidate option area when no input information of the user is captured.

Figure 3:
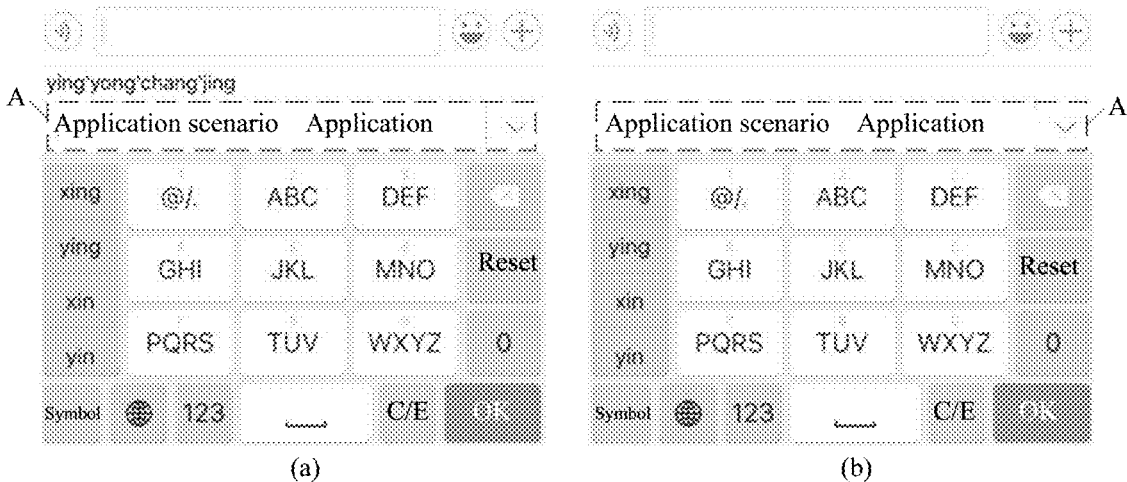
FIG. 3 is a schematic diagram of a candidate option area and a default candidate option area of an input method according to an embodiment of the present invention.

For example, as shown in FIG. 3 (*a*), area A is referred to as a candidate option area in this case. As shown in FIG. 3 (*b*), area A is referred to as a default candidate option area in this case.

A method for displaying a candidate word according to this embodiment of the present invention may be performed by an apparatus for displaying a candidate word (referred to as a display apparatus for ease of description in all the following method embodiments). The display apparatus may be an independent functional module that can implement the method; or may be an input method application; or may be a functional module that is integrated with an input method application and can implement the method; or may be an intelligent terminal; or may be a functional module that is integrated with an intelligent terminal and can implement the method. Specifically, this may be determined according to an actual use requirement, and is not limited in the present invention.

Figure 4:
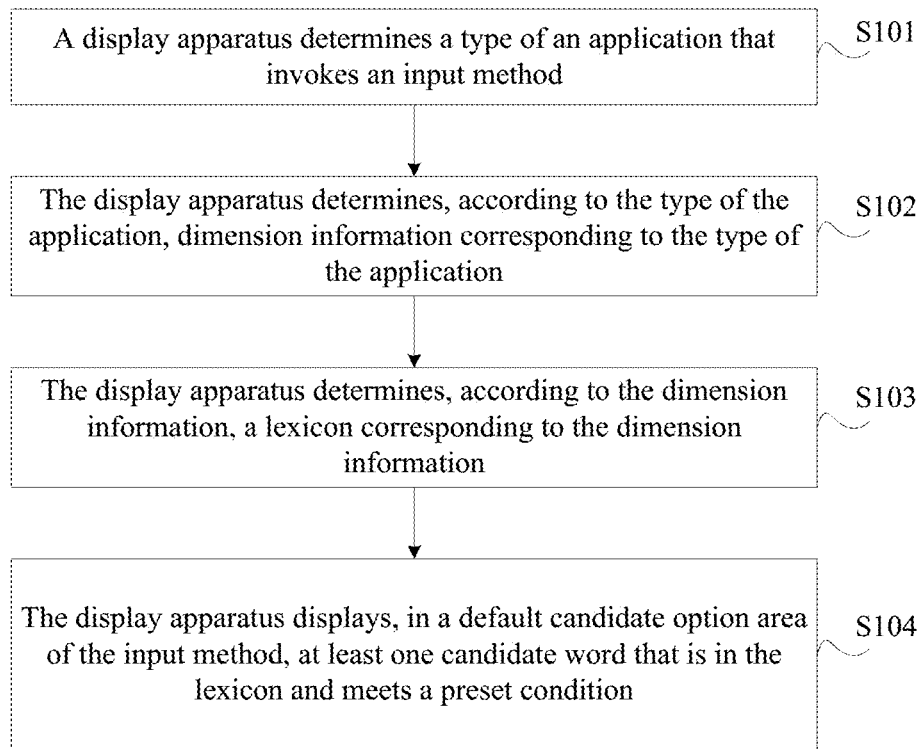
FIG. 4 is a schematic diagram 1 of a method for displaying a candidate word according to an embodiment of the present invention.

As shown in FIG. 4, an embodiment of the present invention provides a method for displaying a candidate word. The method is applied to a scenario in which a user enters information by using an input method, and the input method is installed in an operating system of an intelligent terminal. The method may include the following steps.

S101. A display apparatus determines a type of an application that invokes an input method.

Generally, when using an application, the user needs to enter information by using the input method. For example, when entering short information by using a short message application, the user needs to enter the short information by using the input method.

In this embodiment of the present invention, the application may also be referred to as an application program (application, APP). The application may be an application included in the operating system of the intelligent terminal, or may be a third-party application installed in the operating system of the intelligent terminal. This is not specifically limited in the present invention.

The type of the application may include a chat type, a map type, a commodity type, an audio/video type, or an application market type. For example, the application of the chat type may include a short message application included in the operating system of the intelligent terminal, a third-party communications application installed in the operating system of the intelligent terminal, or the like. The application of the map type may include a map application included in the operating system of the intelligent terminal, a third-party map application installed in the operating system of the intelligent terminal, other applications (such as various travel applications or taxi hailing applications), or the like. The application of the commodity type may include a shopping application included in the operating system of the intelligent terminal, a third-party shopping application installed in the operating system of the intelligent terminal, or the like. The application of the audio/video type may include an audio playing application or a video playing application included in the operating system of the intelligent terminal, an audio playing application or a video playing application installed in the operating system of the intelligent terminal, or the like. The application of the application market type may include an application store included in the operating system of the intelligent terminal, the application store installed in the operating system of the intelligent terminal, or the like.

S102. The display apparatus determines, according to the type of the application, dimension information corresponding to the type of the application.

In this embodiment of the present invention, because types of applications are different, scenarios in which applications are used may also vary. To indicate scenarios in which various applications are used, dimension information is used in this embodiment of the present invention.

In a specific implementation, a correspondence between a type of an application and dimension information is pre-stored. For example, for the application of the chat type, on a special holiday, when the application of the chat type invokes the input method, some candidate words related to the special holiday may need to be recommended to the user by using a default candidate option area of the input method. In this case, dimension information corresponding to the chat type may be related to a date. For example, the dimension information may be a date dimension. For another example, for the application of the commodity type, the user may search for a commodity after starting the application of the type. This requires that commodities that the user has searched for and/or commodities that other users are popularly searching for should be recommended to the user. In this case, dimension information corresponding to the commodity type may be related to a historical search record and/or a search popularity record of the user. For example, the dimension information may be a historical record dimension and/or a search popularity dimension.

Optionally, in the method for displaying a candidate word according to this embodiment of the present invention, S102 may specifically include:

S102a. The display apparatus determines, according to the type of the application and a preset correspondence set, the dimension information corresponding to the type of the application, where the correspondence set includes a correspondence between the type of the application and the dimension information.

The preset correspondence set may include correspondences between types of multiple applications and dimension information. The correspondence between the type of the application and the dimension information in S102a is only one correspondence in the correspondence set. To help understand the technical solution provided by this embodiment of the present invention, herein only the type of the application that invokes the input method and the dimension information corresponding to the type are used as an example for description. The rest are not described in detail herein.

For example, as shown in Table 1, Table 1 is an implementation form of possible correspondences between types of applications and dimension information according to this embodiment of the present invention.

TABLE 1

| Type of an application | Dimension information |
| --- | --- |
| Chat type | Date dimension |
| | Date dimension and chat object dimension |
| Map type | Historical record dimension |
| Commodity type, audio/video type, or application market type | Historical record dimension and/or search popularity dimension |

Table 1 may be understood as a preset correspondence set. If the type of the application is the chat type, the dimension information corresponding to the type is the date dimension, or the date dimension and the chat object dimension. If the type of the application is the map type, the dimension information corresponding to the type is the historical record dimension. If the type of the application is the commodity type, the audio/video type, or the application market type, the dimension information corresponding to the type is the historical record dimension and/or the search popularity dimension.

It should be noted that, the types of the applications and the dimension information shown in Table 1 are only illustrative. In a specific implementation, more types of applications and dimension information, for example, other types of applications and dimension information that meet a use requirement, may also be included.

In the method for displaying a candidate word according to this embodiment of the present invention, because dimension information corresponding to the type of each application is preset, after the display apparatus determines the type of the application that invokes the input method, the display apparatus may determine, according to the type, the dimension information corresponding to the type. In addition, because each piece of dimension information uniquely corresponds to one lexicon, after determining the dimension information, the display apparatus may determine, according to the dimension information, a lexicon corresponding to the dimension information.

S103. The display apparatus determines, according to the dimension information, a lexicon corresponding to the dimension information.

In this embodiment of the present invention, for each piece of dimension information, a lexicon corresponding to the dimension information may be stored.

Optionally, in this embodiment of the present invention, lexicons corresponding to the dimension information shown in Table 1 may be respectively as follows: A lexicon corresponding to the date dimension is a date lexicon; a lexicon corresponding to the chat object dimension is a chat object lexicon; a lexicon corresponding to the historical record dimension is a historical record lexicon; and a lexicon corresponding to the search popularity dimension is a search popularity lexicon.

For example, as shown in Table 2, Table 2 is an implementation form of possible correspondences between dimension information and lexicons according to this embodiment of the present invention.

TABLE 2

| Dimension information | Lexicon |
|---|---|
| Date dimension | Date lexicon |
| Chat object dimension | Chat object lexicon |
| Historical record dimension | Historical record lexicon |
| Search popularity dimension | Search popularity lexicon |

It should be noted that, the dimension information and lexicons shown in Table 2 are only illustrative. In a specific implementation, more dimension information and lexicons, for example, other dimension information and lexicons that meet a use requirement, may also be included.

For example, for the dimension information shown in Table 1, the lexicons corresponding to the dimension information in this embodiment of the present invention may be prestored, or may be stored in a process of entering information by the user by using the input method. For example, the date lexicon corresponding to the date dimension may be prestored, that is, greetings corresponding to each holiday are prestored in the date lexicon. For another example, the chat object lexicon corresponding to the chat object dimension may be stored when the user chats with a chat object by using the application of the chat type, that is, a relationship between the user and the chat object may be stored in the chat object lexicon according to a nickname of the chat object that is set by the user in the application of the chat type, content about which the user chats with the chat object by using the application of the chat type, a title frequently used when the user chats with the chat object by using the application of the chat type, or the like. For still another example, the historical record lexicon corresponding to the historical record dimension may be stored when the user uses the application of the map type, the application of the commodity type, the application of the audio/video type, or the application of the application market type, that is, a search record of the user may be stored in the historical record lexicon according to a search record when the user uses the applications of the types.

Optionally, in this embodiment of the present invention, one lexicon uniquely corresponds to one piece of dimension information, that is, the lexicons correspond to the dimension information on a one-to-one basis.

For example, as shown in Table 2, the date dimension uniquely corresponds to the date lexicon; the chat object dimension uniquely corresponds to the chat object lexicon; the historical record dimension uniquely corresponds to the historical record lexicon; and the search popularity dimension uniquely corresponds to the search popularity lexicon.

In this embodiment of the present invention, if the dimension information corresponding to the type of the application that invokes the input method is the date dimension, a candidate word displayed in the default candidate option area of the input method can be determined only in the date lexicon uniquely corresponding to the date dimension; if the dimension information corresponding to the type of the application that invokes the input method is the chat object dimension, a candidate word displayed in the default candidate option area of the input method can be determined only in the chat object lexicon uniquely corresponding to the chat object dimension; if the dimension information corresponding to the type of the application that invokes the input method is the historical record dimension, a candidate word displayed in the default candidate option area of the input method can be determined only in the historical record lexicon uniquely corresponding to the historical record dimension; or if the dimension information corresponding to the type of the application that invokes the input method is the search popularity dimension, a candidate word displayed in the default candidate option area of the input method can be determined only in the search popularity lexicon uniquely corresponding to the search popularity dimension. Therefore, when the input method is applied to different application scenarios, it may be ensured to some extent that candidate words determined from the corresponding lexicon may be the words that the user needs to enter, and further, the candidate words are displayed in the default candidate option area of the input method. This can further improve efficiency of the user in entering information by using the input method.

S104. The display apparatus displays, in a default candidate option area of the input method, at least one candidate word that is in the lexicon and meets a preset condition.

In this embodiment of the present invention, corresponding to the type of the application and the dimension information shown in Table 1 and the dimension information and the lexicon shown in Table 2, the at least one candidate word that meets the preset condition in S104 may be specifically as follows:

When the type of the application is the chat type, and the dimension information is the date dimension, and the lexicon is the date lexicon, the at least one candidate word that meets the preset condition is: at least one candidate word that is in the date lexicon and corresponds to a first date, where the first date is a date that is in the date lexicon and the same as a current date.

When the type of the application is the chat type, and the dimension information is the date dimension and the chat object dimension, and the lexicon is the date lexicon and the chat object lexicon, the at least one candidate word that meets the preset condition is: at least one candidate word that is in the date lexicon and corresponds to a first date, where the first date is a date that is in the date lexicon and the same as a current date, a binding relationship exists between the first date and a first relationship, and a relationship between the user and an object currently chatting with the user is the first relationship in the chat object lexicon.

When the type of the application is the map type, and the dimension information is the historical record dimension, and the lexicon is the historical record lexicon, the at least one candidate word that meets the preset condition is: at least one candidate word that is in the historical record lexicon and corresponds to first latitude and longitude and the application, where the first latitude and longitude are latitude and longitude that are in the historical record lexicon and the same as latitude and longitude of a current location of the user.

When the type of the application is the commodity type, the audio/video type, or the application market type, and the dimension information is the historical record dimension and/or the search popularity dimension, and the lexicon is the historical record lexicon and/or the search popularity lexicon, the at least one candidate word that meets the preset condition is: at least one candidate word that is in the historical record lexicon and/or the search popularity lexicon and corresponds to the application, and whose search frequency is highest, and whose last search date is closest to a current date.

In the foregoing types of applications, descriptions about the at least one candidate word that meets the preset condition are only illustrative descriptions about the listed types of applications in this embodiment of the present invention. Certainly, in an actual implementation, more types of applications may be included. Correspondingly, as the type of the application varies, the at least one candidate word that meets the preset condition in this embodiment of the present invention may also be different. Details are not further described exhaustively in this embodiment of the present invention.

Corresponding to the lexicons shown in Table 2, the following describes the several lexicons separately by using examples.

For example, as shown in Table 3, Table 3 is a possible implementation form of the date lexicon according to this embodiment of the present invention.

TABLE 3

| Date or holiday name | Candidate word |
|---|---|
| Spring Festival (February 8) | Happy Spring Festival |
| Valentine's Day (February 14) | Happy Valentine's Day |
| Mother's Day (May 8) | Happy Mother's Day and good health |

In an actual application, dates of some holidays are fixed every year. For example, generally, Valentine's Day is February 14 every year. However, dates of some holidays may change every year. For example, the Spring Festival is February 19 in 2015, but is February 18 in 2016; Mother's Day is May 10 in 2015, but is May 8 in 2016. Therefore, dates in the date lexicon in this embodiment of the present invention may be implemented by using specific dates, or may be implemented by using holiday names. When a date in the date lexicon is implemented by using a specific date, the date lexicon may be updated at least once every year, and the display apparatus may determine a corresponding candidate word directly according to the date when performing S104. When a date in the date lexicon is implemented by using a holiday name, when performing the foregoing S104, the display apparatus needs to first determine whether the current date is a date corresponding to the holiday name in a year to which the current date belongs, and if yes, the display apparatus determines a corresponding candidate word according to the holiday name.

The date and holiday name are only two implementations illustrated in this embodiment of the present invention. Because the holiday name generally also corresponds to the date, in this embodiment of the present invention, the date used when the at least one candidate word that meets the preset condition is determined may also be indicated by the holiday name. This is not specifically limited in the present invention.

For example, for the application of the chat type, assuming that the current date is Feb. 8, 2016, the at least one candidate word that meets the preset condition is: a candidate word that is in the date lexicon shown in Table 3 and corresponds to February 8, namely, "Happy Spring Festival". February 8 (namely, the first date) is a date that is in the date lexicon shown in Table 3 and the same as the current date. Therefore, when the user chats with a friend of the user by using the application of the chat type on February 8, that is, when the application of the chat type invokes the input method, the display apparatus may display the foregoing "Happy Spring Festival" in the default candidate option area of the input method.

Figure 5:
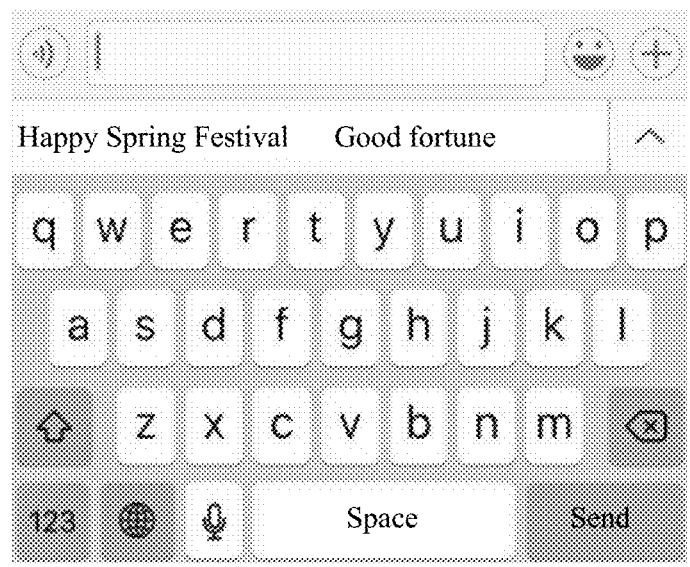
FIG. 5 is a schematic diagram 1 of candidate words displayed in a default candidate option area of an input method according to an embodiment of the present invention.

It may be understood that, as shown in FIG. 5, in the method for displaying a candidate word according to this embodiment of the present invention, assuming that it is the Spring Festival, when the user chats with a chat object by using the application of the chat type, that is, when the application of the chat type invokes the input method, the display apparatus may display candidate words such as "Happy Spring Festival and good fortune" in the default candidate option area of the input method.

Table 3 shows an example in which the Spring Festival is only one day. In an actual implementation, the Spring Festival may be a period of time (for example, the first day in the first lunar month to the fifteenth day in the first lunar month). Therefore, in all the fifteen days, the display apparatus may display the foregoing candidate word in the default candidate option area of the input method.

It should be noted that, the date lexicon shown in Table 3 is only illustrative. In a specific implementation, the date lexicon may further include more dates or holiday names and candidate words, for example, other dates or holiday names and candidate words that meet a use requirement.

For example, as shown in Table 4, Table 4 is a possible implementation form of the chat object lexicon according to this embodiment of the present invention.

TABLE 4

| Chat object | Relationship with the user |
|---|---|
| User 1 | Lovers |
| User 2 | Mother and son |
| User 3 | Friends |

For example, for the application of the chat type, assuming that the current date is Feb. 14, 2016, and that the object chatting with the user is the user 1, the at least one candidate word that meets the preset condition is: a candidate word that is in the date lexicon shown in Table 3 and corresponds to February 14, namely, "Happy Valentine's Day". February 14 (namely, the first date) is a date that is in the date lexicon shown in Table 3 and the same as the current date, a binding relationship exists between February 14 and "lovers" (namely, the first relationship), and a relationship between the user and the user 1 is "lovers" in the chat object lexicon shown in Table 4. Therefore, when the user chats with the user 1 by using the application of the chat type on February 14, that is, when the application of the chat type invokes the input method, the display apparatus may display the foregoing "Happy Valentine's Day" in the default candidate option area of the input method.

Figure 6:
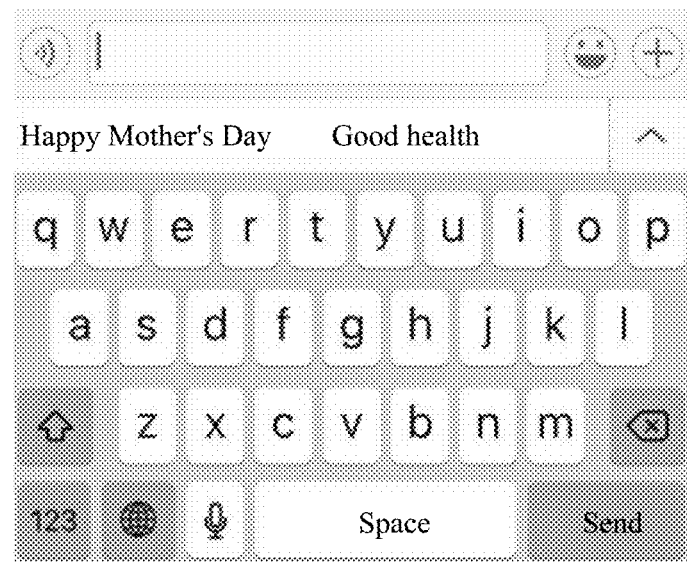
FIG. 6 is a schematic diagram 2 of candidate words displayed in a default candidate option area of an input method according to an embodiment of the present invention.

It may be understood that, as shown in FIG. 6, in the method for displaying a candidate word according to this embodiment of the present invention, assuming that it is Mother's Day, when the user chats with the user's mother by using the application of the chat type, that is, when the application of the chat type invokes the input method, the display apparatus may display candidate words such as "Happy Mother's Day and good health" in the default candidate option area of the input method.

In a specific implementation, a chat object column (namely, the user 1, the user 2, and the user 3) in the chat object lexicon shown in Table 4 may be represented by the nickname of the chat object set by the user in the application of the chat type, the title frequently used when the user chats with the chat object by using the application of the chat type, or the like. Specifically, this may be set according to an actual use requirement, and is not limited in the present invention.

It should be noted that, the chat object lexicon shown in Table 4 is only illustrative. In a specific implementation, the chat object lexicon may further include more chat objects and relationships between the chat objects and the user, for example, other chat objects and relationships between the chat objects and the user that meet a use requirement.

For example, as shown in Table 5, Table 5 is a possible implementation form of the historical record lexicon according to this embodiment of the present invention.

TABLE 5

| Application name | Candidate word | Quantity of searches | Quantity of days from a last search date to a current date | Latitude and longitude |
|---|---|---|---|---|
| Application 1 | Coffee | 5 | Less than 1 | — |
| Application 1 | Router | 2 | 3 | — |
| Application 2 | Coffee | 4 | Less than 1 | — |
| Application 2 | Sweater | 6 | 2 | — |
| Application 3 | Great Wild Goose Pagoda | 3 | 5 | Latitude and longitude 1 |
| Application 3 | Confucius Temple | 1 | 30 | Latitude and longitude 2 |
| Application 4 | Confucius Temple | 1 | 16 | Latitude and longitude 2 |
| Application 1 | Mobile power pack | 4 | 2 | — |

In this embodiment of the present invention, because the historical record lexicon records historical search records corresponding to multiple applications, when a candidate word is determined from the historical record lexicon, it is further necessary to determine which application the application invoking the input method is (specifically, this may be implemented by performing S101).

For example, for the application of the map type, assuming that the latitude and longitude of the current location of the user are the latitude and longitude 2, and that the application that invokes the input method is the application 3, the at least one candidate word that meets the preset condition is: a candidate word that is in the historical record lexicon shown in Table 5 and corresponds to the latitude and longitude 2 and the application 3, namely, "Confucius Temple". The latitude and longitude 2 (namely, the first latitude and longitude) are latitude and longitude that are in the historical record lexicon and the same as the latitude and longitude of the current location of the user. Therefore, when the user at the location indicated by the latitude and longitude 2 uses the application 3 to search for a destination, that is, when the application 3 invokes the input method, the display apparatus may display the foregoing "Confucius Temple" in the default candidate option area of the input method.

Figure 7:
FIG. 7 is a schematic diagram 3 of candidate words displayed in a default candidate option area of an input method according to an embodiment of the present invention.

It may be understood that, as shown in FIG. 7, in the method for displaying a candidate word according to this embodiment of the present invention, assuming that the user is in a city, when the user searches for a destination by using the application of the map type, that is, when the application of the map type invokes the input method, the display apparatus may display, in the default candidate option area of the input method, names of destinations to which the user has been in the city, for example, candidate words "Great Wild Goose Pagoda and Terracotta Warriors".

It should be noted that, the historical record lexicon shown in Table 5 is only illustrative. In a specific implementation, the historical record lexicon may further include more application names, candidate words, quantity of searches, quantity of days from a last search date to a current date, and latitude and longitude, for example, other application names, candidate words, quantity of searches, quantity of days from a last search date to a current date, and latitude and longitude that meet a use requirement.

For example, as shown in Table 6, Table 6 is a possible implementation form of the search popularity lexicon according to this embodiment of the present invention.

TABLE 6

| Application name | Candidate word | Quantity of searches | Quantity of days from a last search date to a current date |
|---|---|---|---|
| Application 1 | Coffee | 20000 | 2 |
| Application 1 | Router | 31000 | Less than 1 |
| Application 2 | Mobile power pack | 120000 | Less than 1 |

For example, for the application of the commodity type, the application of the audio/video type, or the application of the application market type, if the lexicon corresponding to the application of the type is the historical record lexicon, assuming that the application that invokes the input method is the application 1, the at least one candidate word that meets the preset condition is: a candidate word that is in the historical record lexicon shown in Table 5 and corresponds to the application 1, and whose search frequency is highest, and whose last search date is closest to the current date, namely, "coffee". Therefore, when the user searches for a commodity by using the application 1, that is, when the application 1 invokes the input method, the display apparatus may display the foregoing "coffee" in the default candidate option area of the input method.

For the application of the commodity type, the application of the audio/video type, or the application of the application market type, if the lexicon corresponding to the application of the type is the search popularity lexicon, assuming that the application that invokes the input method is the application 1, the at least one candidate word that meets the preset condition is: a candidate word that is in the search popularity lexicon shown in Table 6 and corresponds to the application 1, and whose search frequency is highest, and whose last search date is closest to the current date, namely, "router". Therefore, when the user searches for a commodity by using the application 1, that is, when the application 1 invokes the input method, the display apparatus may display the foregoing "router" in the default candidate option area of the input method.

For the application of the commodity type, the application of the audio/video type, or the application of the application market type, if the lexicon corresponding to the application of the type is the historical record lexicon and the search popularity lexicon, assuming that the application that invokes the input method is the application 1, the at least one candidate word that meets the preset condition is: a candidate word that is in the historical record lexicon shown in Table 5 and corresponds to the application 1, and whose search frequency is highest, and whose last search date is closest to the current date, and a candidate word that is in the search popularity lexicon shown in Table 6 and corresponds to the application 1, and whose search frequency is highest, and whose last search date is closest to the current date, namely, "coffee" and "router". Therefore, when the user searches for a commodity by using the application 1, that is, when the application 1 invokes the input method, the display apparatus may display the foregoing "coffee" and "router" in the default candidate option area of the input method.

Figure 8:
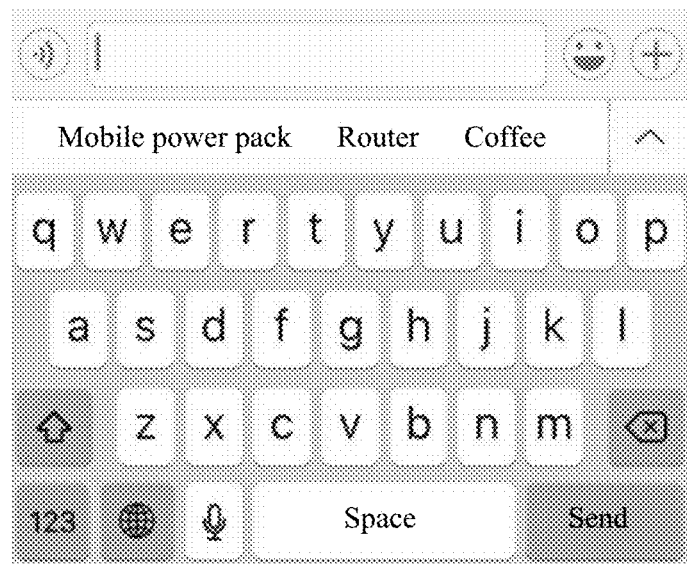
FIG. 8 is a schematic diagram 4 of candidate words displayed in a default candidate option area of an input method according to an embodiment of the present invention.

It may be understood that, as shown in FIG. 8, in the method for displaying a candidate word according to this embodiment of the present invention, assuming that it is a particular date, the user searches for a commodity by using the application of the commodity type, that is, when the application of the commodity type invokes the input method, the display apparatus may display, in the default candidate option area of the input method, names of commodities that the user recently searches for most frequently and names of commodities that all users recently search for popularly, for example, candidate words "mobile power pack, router, coffee".

It should be noted that, the search popularity lexicon shown in Table 6 is only illustrative. In a specific implementation, the search popularity lexicon may further include more application names, candidate words, quantity of searches, and quantity of days from a last search date to a current date, for example, other application names, candidate words, quantity of searches, and quantity of days from a last search date to a current date that meet a use requirement.

In all the examples illustrated in Table 3 to Table 6, it is assumed that the candidate word determined by the display apparatus by performing S104 is one or two candidate words. Specifically, the quantity of candidate words may be determined according to an actual use requirement. For example, the quantity of candidate words may be determined according to a size of the default candidate option area of the input method and/or a scale of displayed candidate words. This is not limited in the present invention.

Further, when multiple pieces of dimension information correspond to a type of an application, each of the multiple pieces of dimension information corresponds to one lexicon. In this case, in this embodiment of the present invention, according to weights preset for the multiple pieces of dimension information, the display apparatus may determine several candidate words from the lexicon corresponding to each piece of dimension information. Specifically, the method for determining a candidate word from the lexicon corresponding to each piece of dimension information is the same as the foregoing method for determining a candidate word from a lexicon corresponding to corresponding dimension information. Details are not further described herein.

For example, assuming that two pieces of dimension information, namely, dimension information 1 and dimension information 2, correspond to a type of an application, and a lexicon corresponding to the dimension information 1 is a lexicon 1, and a lexicon corresponding to the dimension information 2 is a lexicon 2, and a weight of the dimension information 1 is 2, and a weight of the dimension information 2 is 3, if the default candidate option area of the input method can display five candidate words in total, the display apparatus may determine two candidate words from the lexicon 1, and determine three candidate words from the lexicon 2. Specifically, this may be determined according to an actual use requirement, and is not limited in the present invention.

In the foregoing method, candidate words displayed in the default candidate option area of the input method may be determined with reference to the multiple pieces of dimension information. Therefore, the determined candidate words can better meet an input requirement of the user, and efficiency of the user in entering information by using the input method may be further improved.

Further, Table 1 to Table 6 are only examples for describing the method for displaying a candidate word according to this embodiment of the present invention. In a specific implementation, more attributes or conditions (one column of each table is an attribute or a condition) may be further included in Table 1 to Table 6. This is not specifically limited in the present invention.

This embodiment of the present invention provides a method for displaying a candidate word. The method is applied to a scenario in which a user enters information by using an input method, and the method includes: determining a type of an application that invokes the input method; determining, according to the type, dimension information corresponding to the type; determining, according to the dimension information, a lexicon corresponding to the dimension information; and displaying, in a default candidate option area of the input method, at least one candidate word that is in the lexicon and meets a preset condition.

Based on the foregoing method, in the method for displaying a candidate word according to this embodiment of the present invention, when the candidate word is displayed in the default candidate option area of the input method, reference may be made to an application scenario of the input method, that is, by which type of application the input method is invoked, then the corresponding dimension information is determined according to the type of the application, and the lexicon corresponding to the dimension information is determined, that is, the lexicon is a lexicon that matches the application scenario of the input method. Therefore, it may be ensured to some extent that candidate words determined from the lexicon may be words that the user needs to enter, and further, the candidate words are displayed in the default candidate option area of the input method. This can improve efficiency of the user in entering information by using the input method.

Figure 9:
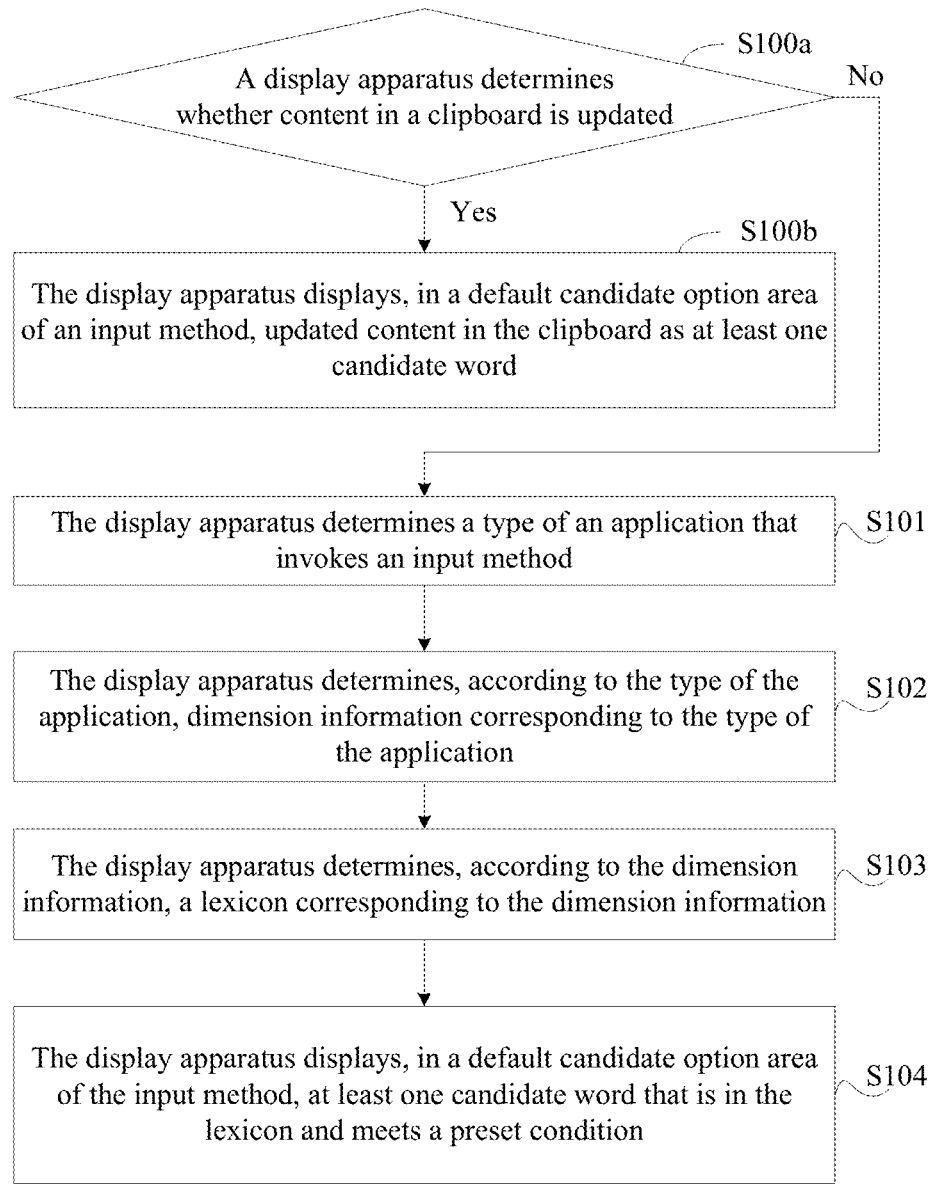
FIG. 9 is a schematic diagram 2 of a method for displaying a candidate word according to an embodiment of the present invention.

Optionally, with reference to FIG. 4, as shown in FIG. 9, before S101, the method for displaying a candidate word according to this embodiment of the present invention may further include:

S100a. The display apparatus determines whether content in a clipboard is updated.

If the display apparatus determines that the content in the clipboard is updated, the display apparatus performs S100b.

If the display apparatus determines that the content in the clipboard is not updated, the display apparatus performs S101.

S100b. The display apparatus displays, in the default candidate option area of the input method, updated content in the clipboard as at least one candidate word.

Figure 10:
FIG. 10 is a schematic diagram 5 of candidate words displayed in a default candidate option area of an input method according to an embodiment of the present invention.

For example, as shown in FIG. 10, FIG. 10 is a schematic diagram of candidate words displayed in the default candidate option area of the input method when the user triggers a copying process. In FIG. 10 (a), the user triggers a copying process, that is, the operating system of the intelligent terminal performs a copying action (specifically, the operating system of the intelligent terminal copies content "Toward the China dream" that needs to be copied, to a memory of the intelligent terminal, namely, the clipboard). In FIG. 10 (b), when the input method is invoked for the first time after the copying is completed, the display apparatus may display, in the default candidate option area of the input method, the content (namely "Toward the China dream") in the clipboard. That the input method is invoked for the first time after the copying is completed may be specifically implemented by performing S100a when the input method is invoked, that is, the display apparatus determines whether the content in the clipboard is updated. If the content in the clipboard is updated, it indicates that the input method is invoked for the first time after the copying is completed; or if the content in the clipboard is not updated, it indicates that the input method is not invoked for the first time after the copying is completed.

In this embodiment of the present invention, each application installed on the intelligent terminal may access content in the memory of the intelligent terminal.

After the user copies a piece of content, the user may paste the copied content. Therefore, in this embodiment of the present invention, before performing S101, the display apparatus may first determine whether the content in the clipboard is updated (generally, if the content in the clipboard is updated, it indicates that the operating system of the intelligent terminal performs a copying action, that is, the user triggers a copying process; or if the content in the clipboard is not updated, it indicates that the operating system of the intelligent terminal does not perform a copying action, that is, the user does not trigger a copying process). If the content in the clipboard is not updated, the display apparatus performs S101, that is, the display apparatus determines, according to the application scenario of the input method, the candidate word displayed in the default candidate option area of the input method. If the content in the clipboard is updated, the display apparatus may display, in the default candidate option area of the input method, the updated content in the clipboard as the at least one candidate word. This can further improve efficiency of the user in entering the content.

In the method for displaying a candidate word according to this embodiment of the present invention, the lexicon that matches the application scenario may be determined according to the application scenario of the input method. Therefore, it may be ensured to some extent that the candidate words determined from the lexicon may be the words that the user needs to enter. Therefore, the candidate words are displayed in the default candidate option area of the input method. This can improve efficiency of the user in entering information by using the input method.

Further, when the user triggers a copying process, the user may need to paste copied content by using the input method. Therefore, in the method for displaying a candidate word according to this embodiment of the present invention, when the input method is invoked, the candidate word displayed in the default candidate option area of the input method may be determined according to whether the content in the clipboard is updated. That is, if the user triggers a copying process, the content in the clipboard is updated. Therefore, the updated content in the clipboard may be displayed in the default candidate option area of the input method (that is, the updated content in the clipboard is displayed as the at least one candidate word in the default candidate option area of the input method). This can further improve efficiency of the user in entering information by using the input method.

Figure 11:
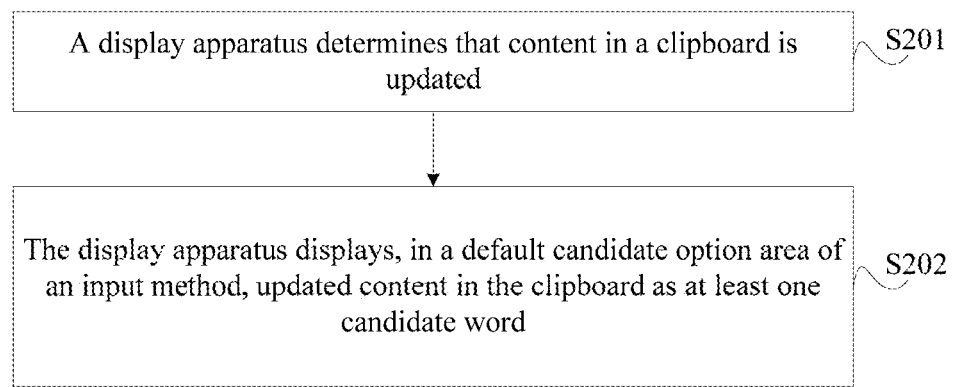
FIG. 11 is a schematic diagram 1 of another method for displaying a candidate word according to an embodiment of the present invention.

As shown in FIG. 11, an embodiment of the present invention provides a method for displaying a candidate word. The method is applied to a scenario in which a user enters information by using an input method, and the input method is installed in an operating system of an intelligent terminal. The method may include the following steps.

S201. A display apparatus determines that content in a clipboard is updated.

S202. The display apparatus displays, in a default candidate option area of an input method, updated content in the clipboard as at least one candidate word.

For example, as shown in FIG. 10, FIG. 10 is a schematic diagram of candidate words displayed in the default candidate option area of the input method when the user triggers a copying process. Specifically, for descriptions about FIG. 10, refer to the foregoing descriptions about FIG. 10 in the embodiment shown in FIG. 9. Details are not further described herein.

After the user copies a piece of content, the user may paste the copied content. Therefore, in this embodiment of the present invention, if the display apparatus determines that the content in the clipboard is updated, the display apparatus may display, in the default candidate option area of the input method, the updated content in the clipboard as the at least one candidate word (to recommend content that the user may need to enter to the user). Therefore, efficiency of the user in entering information by using the input method can be improved.

Figure 12:
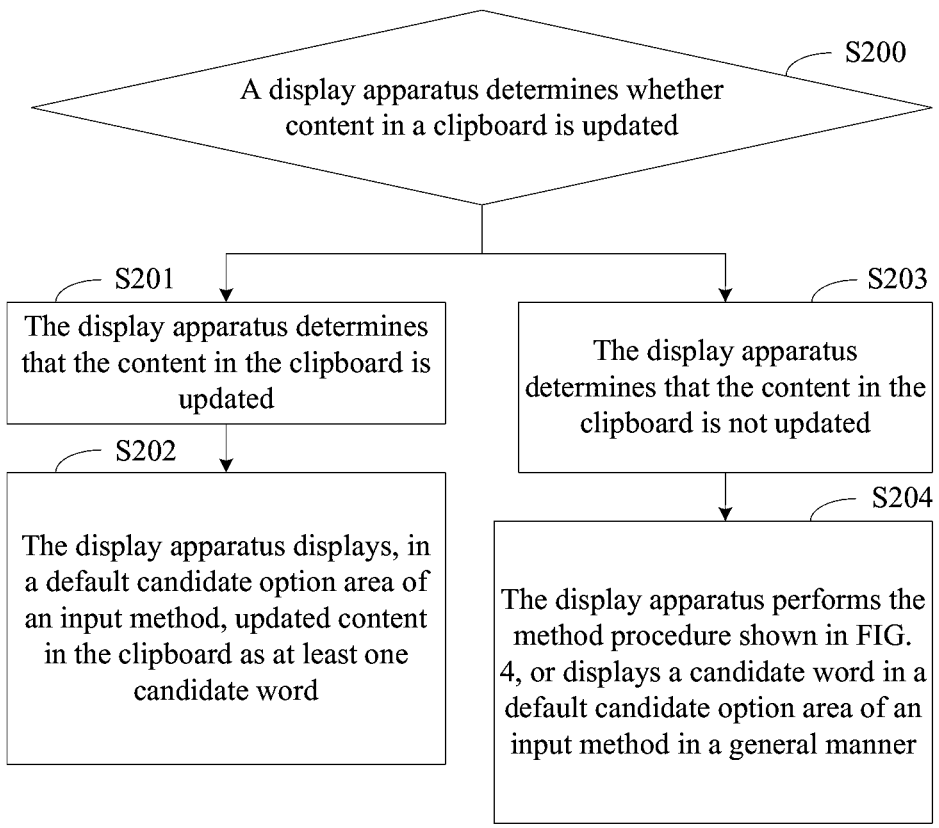
FIG. 12 is a schematic diagram 2 of another method for displaying a candidate word according to an embodiment of the present invention.

Optionally, with reference to FIG. 11, as shown in FIG. 12, before S201, the method for displaying a candidate word according to this embodiment of the present invention may further include:

S200. The display apparatus determines whether the content in the clipboard is updated.

In this embodiment of the present invention, when the input method is invoked, the display apparatus may first determine whether the content in the clipboard is updated (generally, if the content in the clipboard is updated, it indicates that the operating system of the intelligent terminal performs a copying action, that is, the user triggers a copying process; or if the content in the clipboard is not updated, it indicates that the operating system of the intelligent terminal does not perform a copying action, that is, the user does not trigger a copying process). Then the display apparatus performs a corresponding action according to a determining result.

Further, as shown in FIG. 12, after S200, the method for displaying a candidate word according to this embodiment of the present invention may further include:

S203. The display apparatus determines that the content in the clipboard is not updated.

S204. The display apparatus performs the method procedure shown in FIG. 4, or displays a candidate word in a default candidate option area of an input method in a general manner.

Figure 1:
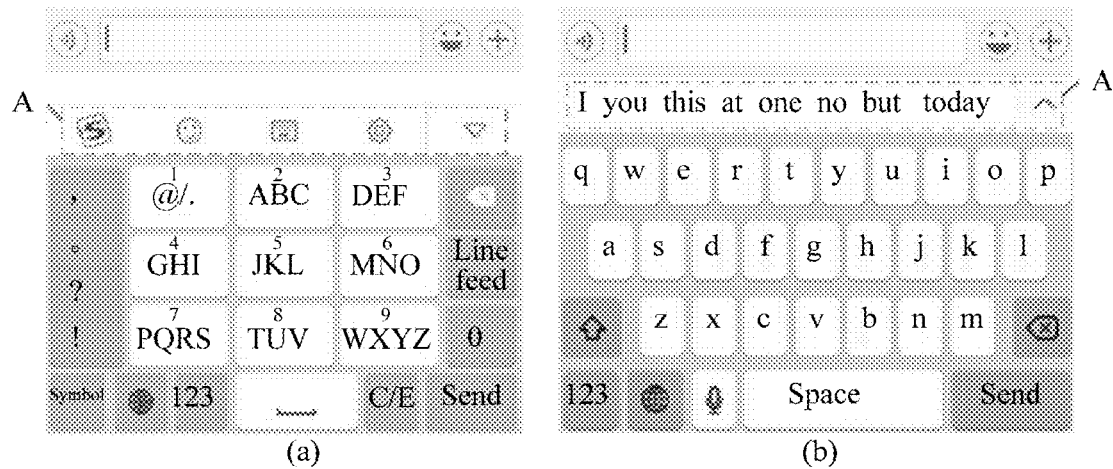
FIG. 1 is a schematic diagram of candidate words displayed in a default candidate option area of an input method according to the prior art.

In this embodiment of the present invention, if the display apparatus determines that the content in the clipboard is not updated, that is, the user does not trigger a copying process, the display apparatus may determine the candidate word displayed in the default candidate option area of the input method by using the method procedure shown in FIG. 4 in the foregoing embodiment, or the display apparatus may display the candidate word in the default candidate option area of the input method in a general manner (for example, the two manners shown in FIG. 1).

In the method for displaying a candidate word according to this embodiment of the present invention, when the user triggers a copying process, the user may need to paste copied content by using the input method. Therefore, in the method for displaying a candidate word according to this embodiment of the present invention, when the input method is invoked, the candidate word displayed in the default candidate option area of the input method may be determined according to whether the content in the clipboard is updated. That is, if the user triggers a copying process, the content in the clipboard is updated. Therefore, the updated content in the clipboard may be displayed in the default candidate option area of the input method (that is, the updated content in the clipboard is displayed as the at least one candidate word in the default candidate option area of the input method). This can further improve efficiency of the user in entering information by using the input method.

Figure 13:
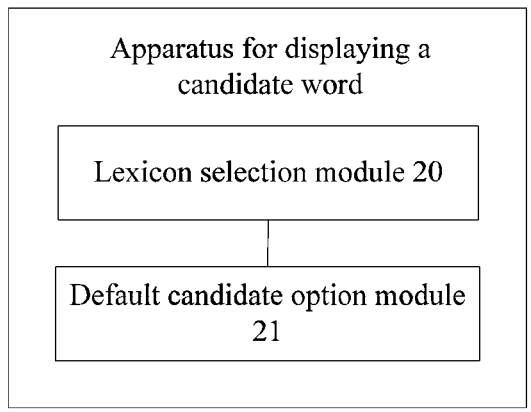
FIG. 13 is a schematic diagram of an apparatus for displaying a candidate word according to an embodiment of the present invention.

As shown in FIG. 13, an embodiment of the present invention provides an apparatus for displaying a candidate word. The apparatus is applied to a scenario in which a user enters information by using an input method. The apparatus is configured to perform the steps performed by the display apparatus in the foregoing method embodiment shown in FIG. 4 or FIG. 9. The apparatus may include modules corresponding to corresponding steps. For example, the apparatus may include a lexicon selection module 20 and a default candidate option module 21.

The lexicon selection module 20 is configured to determine a type of an application that invokes the input method, determine, according to the type, dimension information corresponding to the type, and determine, according to the dimension information, a lexicon corresponding to the dimension information. The default candidate option module 21 is configured to display, in a default candidate option area of the input method, at least one candidate word that is in the lexicon selected by the lexicon selection module 20 and meets a preset condition.

It should be noted that, the apparatus for displaying a candidate word in this embodiment may be the default candidate option recommendation module 12 in the input method shown in FIG. 2; the lexicon selection module 20 in this embodiment may be the lexicon selection module 120 in the input method shown in FIG. 2; and the default candidate option module 21 may be the default candidate option module 121 in the input method shown in FIG. 2.

Optionally, the lexicon selection module 20 is specifically configured to determine, according to the type and a preset correspondence set, the dimension information corresponding to the type, where the correspondence set includes a correspondence between the type and the dimension information.

Optionally, one lexicon uniquely corresponds to one piece of dimension information.

Optionally, in a first possible implementation, the type is a chat type, the dimension information is a date dimension, and the at least one candidate word that meets the preset condition is: at least one candidate word that is in the date lexicon and corresponds to a first date, where the first date is a date that is in the date lexicon and the same as a current date.

Optionally, in a second possible implementation, the type is a chat type, the dimension information is a date dimension and a chat object dimension, the lexicon is a date lexicon corresponding to the date dimension and a chat object lexicon corresponding to the chat object dimension, and the at least one candidate word that meets the preset condition is: at least one candidate word that is in the date lexicon and corresponds to a first date, where the first date is a date that is in the date lexicon and the same as a current date, a relationship between the user and an object currently chatting with the user is a first relationship in the chat object lexicon, and a binding relationship exists between the first date and the first relationship.

Optionally, in a third possible implementation, the type is a map type, the dimension information is a historical record dimension, the lexicon is a historical record lexicon corresponding to the historical record dimension, and the at least one candidate word that meets the preset condition is: at least one candidate word that is in the historical record lexicon and corresponds to first latitude and longitude and the application, where the first latitude and longitude are latitude and longitude that are in the historical record lexicon and the same as latitude and longitude of a current location of the user.

Optionally, in a fourth possible implementation, the type is a commodity type, an audio/video type, or an application market type, the dimension information is a historical record dimension and a search popularity dimension, the lexicon is a historical record lexicon corresponding to the historical record dimension and a search popularity lexicon corresponding to the search popularity dimension, and the at least one candidate word that meets the preset condition is: at least one candidate word that is in the historical record lexicon and the search popularity lexicon and corresponds to the application, and whose search frequency is highest, and whose last search date is closest to a current date.

Optionally, the lexicon selection module 20 is further configured to determine, before determining the type of the application that invokes the input method, that content in a clipboard is updated; and the default candidate option module 21 is further configured to display, in the default candidate option area of the input method, updated content in the clipboard as the at least one candidate word.

In this embodiment of the present invention, in a specific implementation, both the lexicon selection module and the default candidate option module may be implemented by at least one processor. The default candidate option module may be specifically implemented by a display instructed by the processor.

It may be understood that, the apparatus for displaying a candidate word in this embodiment may correspond to the display apparatus in the method for displaying a candidate word in the embodiment shown in FIG. 4 or FIG. 9, and division and/or functions of the modules in the apparatus for displaying a candidate word in this embodiment is/are intended to implement the method procedure shown in FIG. 4 or FIG. 9. To avoid repetition, details are not further described herein.

This embodiment of the present invention provides an apparatus for displaying a candidate word. When the candidate word is displayed in the default candidate option area of the input method, the apparatus may refer to an application scenario of the input method, that is, by which type of application the input method is invoked, then determine the corresponding dimension information according to the type of the application, and determine the lexicon corresponding to the dimension information, that is, the lexicon is a lexicon that matches the application scenario of the input method. Therefore, it may be ensured to some extent that candidate words determined from the lexicon may be words that the user needs to enter, and further, the candidate words are displayed in the default candidate option area of the input method. This can improve efficiency of the user in entering information by using the input method.

As shown in FIG. 13, an embodiment of the present invention provides an apparatus for displaying a candidate word. The apparatus is applied to a scenario in which a user enters information by using an input method. The apparatus is configured to perform the steps performed by the display apparatus in the foregoing method embodiment shown in FIG. 11 or FIG. 12. The apparatus may include modules corresponding to corresponding steps. For example, the apparatus may include a lexicon selection module 20 and a default candidate option module 21.

The lexicon selection module 20 is configured to determine that content in a clipboard is updated; and the default candidate option module 21 is configured to display, in a default candidate option area of the input method, updated content in the clipboard as at least one candidate word according to a result determined by the lexicon selection module 20.

It should be noted that, the apparatus for displaying a candidate word in this embodiment may be the default candidate option recommendation module 12 in the input method shown in FIG. 2; the lexicon selection module 20 in this embodiment may be the lexicon selection module 120 in the input method shown in FIG. 2; and the default candidate option module 21 may be the default candidate option module 121 in the input method shown in FIG. 2.

In this embodiment of the present invention, in a specific implementation, both the lexicon selection module and the default candidate option module may be implemented by at least one processor. The default candidate option module may be specifically implemented by a display instructed by the processor.

It may be understood that, the apparatus for displaying a candidate word in this embodiment may correspond to the display apparatus in the method for displaying a candidate word in the embodiment shown in FIG. 11 or FIG. 12, and division and/or functions of the modules in the apparatus for displaying a candidate word in this embodiment is/are intended to implement the method procedure shown in FIG. 11 or FIG. 12. To avoid repetition, details are not further described herein.

This embodiment of the present invention provides an apparatus for displaying a candidate word. After the user copies a piece of content, the user may paste the copied content. Therefore, in this embodiment of the present invention, when the input method is invoked, if the apparatus determines that the content in the clipboard is updated, the apparatus may display the updated content in the clipboard in the default candidate option area of the input method (that is, display the updated content in the clipboard as the at least one candidate word in the default candidate option area of the input method). Therefore, efficiency of the user in entering information by using the input method can be further improved.

An embodiment of the present invention provides an intelligent terminal, where multiple applications are installed in an operating system of the intelligent terminal. The multiple applications include an input method (also referred to as an input method application), an application of a chat type, an application of a map type, an application of a commodity type, an application of an audio/video type, an application of an application market type, and the like. The input method includes the apparatus for displaying a candidate word as shown in FIG. 13. The apparatus may be configured to perform the method for displaying a candidate option as shown in FIG. 4, FIG. 9, FIG. 11, or FIG. 12.

The intelligent terminal may include at least one processor, an interface circuit, a memory, and a system bus.

The memory is configured to store a computer-executable instruction. The at least one processor, the interface circuit, and the memory are interconnected by the system bus and communicate with each other. When the intelligent terminal runs, the at least one processor executes the computer-executable instruction stored in the memory, so that the intelligent terminal performs the method for displaying a candidate word as shown in FIG. 4, FIG. 9, FIG. 11, or FIG. 12. For a specific method for displaying a candidate word, refer to the descriptions about the embodiment shown in FIG. 4, FIG. 9, FIG. 11, or FIG. 12. Details are not further described herein.

Figure 14:
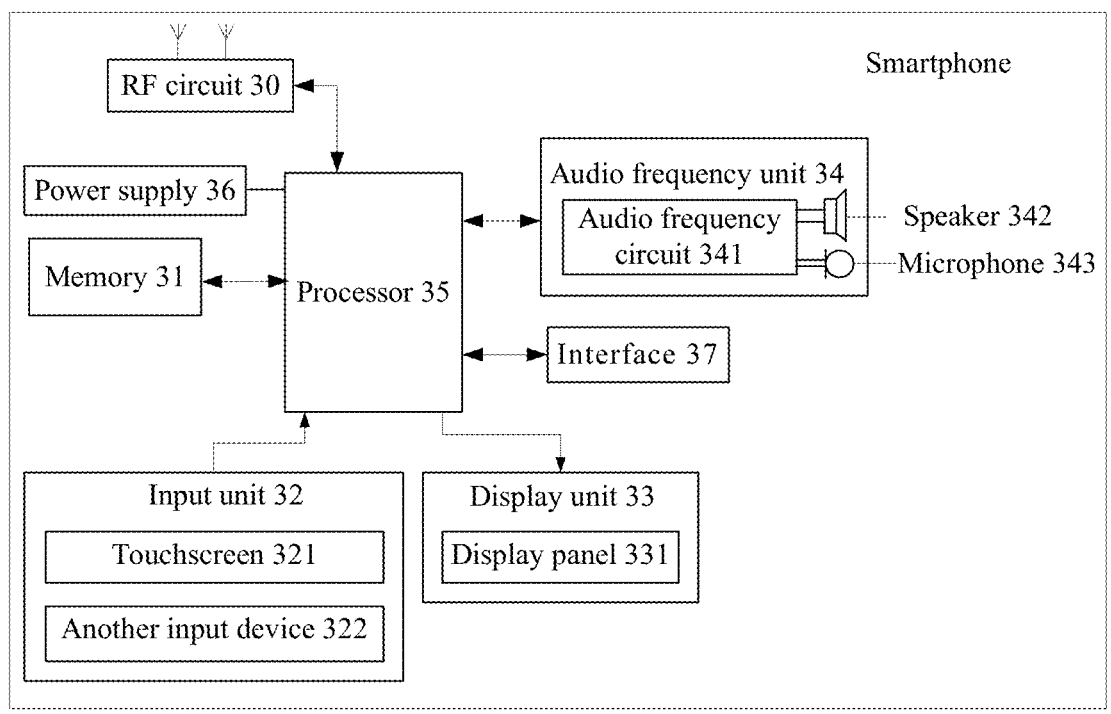
FIG. 14 is a schematic diagram of hardware of a smartphone according to an embodiment of the present invention.

The intelligent terminal may be an intelligent terminal device such as a smartphone, a tablet computer, a notebook computer, an ultra-mobile personal computer (English: ultra-mobile personal computer, UMPC), a netbook, or a personal digital assistant (English: personal digital assistant, PDA). This embodiment of the present invention is described by using an example in which the intelligent terminal is a smartphone. FIG. 14 shows a schematic block diagram of a part of a structure of a smartphone related to each embodiment of the present invention.

As shown in FIG. 14, the smartphone may specifically include components such as a radio frequency (English: radio frequency, RF) circuit 30, a memory 31, an input unit 32, a display unit 33, an audio frequency unit 34, a processor 35, a power supply 36, and an interface 37. A person skilled in the art may understand that the structure of the smartphone shown in FIG. 14 does not constitute a limitation on the smartphone. A specific quantity of components included in the smartphone may be greater or less than that shown in FIG. 14, or some components are combined, or different components are distributed in different positions.

The processor 35 may be the at least one processor. The memory 31 may be the foregoing memory. The RF circuit 30, the input unit 32, the audio frequency unit 34, the power supply 36, and the interface 37 may be the foregoing interface circuit. Connection lines connecting the components in FIG. 14 may be the foregoing system bus.

The following describes each component of the smartphone in detail with reference to FIG. 14.

The RF circuit 30 may be configured to receive or transmit signals in an information reception or transmission or call process, and in particular, after receiving a downlink signal, transmit the downlink signal to the processor 35 for processing, and in addition, transmit an uplink signal. Generally, the RF circuit includes but is not limited to an antenna, at least one amplifier, a transceiver, a coupler, a low noise amplifier (English: low noise amplifier, LNA), a duplexer, or the like. In addition, the RF circuit 30 may further communicate with a network and other devices through wireless communication. The wireless communication may use any communications standard or protocol, including but not limited to the Global System for Mobile Communication (English: global system of mobile communication, GSM), general packet radio service (English: general packet radio service, GPRS), Code Division Multiple Access (English: code division multiple access, CDMA), Wideband Code Division Multiple Access (English: wideband code division multiple access, WCDMA), Long Term Evolution (English: long term evolution, LTE), e-mail, short message service (English: short messaging service, SMS), and the like.

The memory 31 may be configured to store a software program and module. The processor 35 performs various function applications and signal processing of the smartphone by running the software program and module stored in the memory 31. The memory 31 may mainly include a program storage area and a data storage area. The program storage area may store an operating system of the smartphone, an application required by at least one function (such as an application required by an information input function, namely, an input method application, an audio playing function, or an image playing function), or the like. The data storage area may store data (such as a lexicon, audio data, image data, or a phone book created in a process of using the input method by a user) that is created according to usage of the smartphone, or the like. In addition, the memory 31 may include a high-speed random access memory, and may further include a non-volatile memory, for example, at least one magnetic disk storage, a flash memory, or other volatile solid state memories.

The input unit 32 may be configured to receive input digit or character information, and generate a key signal input related to a user setting and function control of the smartphone. Specifically, the input unit 32 may include a touchscreen 321 and another input device 322. The touchscreen 321, also referred to as a touch panel, may capture a touch operation of the user on or near the touchscreen (for example, an operation performed by the user by using any appropriate object or accessory such as a finger or a stylus on the touchscreen 321 or near the touchscreen 321), and drive a corresponding connection apparatus according to a preset program. Optionally, the touchscreen 321 may include two parts: a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 35, and can receive a command transmitted by the processor 35 and execute the command. In addition, the touchscreen 321 may be implemented by using multiple types such as resistive, capacitive, infrared, and surface acoustic wave. The another input device 322 may include but is not limited to one or more of a physical keyboard, a function key (such as a volume control key or a power key), a trackball, a mouse, a joystick, or the like.

The display unit 33 may be configured to display information entered by the user or information provided for the user and various menus of the smartphone. The display unit 33 may include a display panel 331. Optionally, the display panel 331 may be configured in a form of a liquid crystal display (liquid crystal display, LCD), an organic light-emitting diode (organic light-emitting diode, OLED), or the like. Further, the touchscreen 321 may cover the display panel 331. When the touchscreen 321 detects a touch operation on or near the touchscreen, the touchscreen 321 transmits the touch operation to the processor 35 to determine a type of a touch event. Afterward, the processor 35 provides a corresponding visual output on the display panel 331 according to the type of the touch event. Although the touchscreen 321 and the display panel 331 are used as two independent components to implement input and output functions of the smartphone in FIG. 14, the touchscreen 321 and the display panel 331 may be integrated to implement input and output functions of the smartphone in some embodiments.

The audio frequency unit 34 includes an audio frequency circuit 341, a speaker 342, and a microphone 343. The audio frequency unit 34 may provide an audio interface between the user and the smartphone. The audio frequency circuit 341 may transmit an electrical signal converted from received audio data to the speaker 342, and the speaker 342 converts the electrical signal into an audio signal for outputting. On the other hand, the microphone 343 converts a captured audio signal into an electrical signal, and the audio frequency circuit 341 converts the received electrical signal into audio data, and then outputs the audio data to the RF circuit 30; then the audio data is transmitted to another smartphone, or the audio data is output to the memory 31 for further processing.

The processor 35 is a control center of the smartphone. The processor 35 uses various interfaces and lines to connect all parts of the entire smartphone, and executes various functions and data processing of the smartphone by running or executing the software program and module stored in the memory 31 and invoking data stored in the memory 31, thereby implementing corresponding functions of the smartphone. Optionally, the processor 35 may include one or more processing units. Preferably, the processor 35 may integrate an application processor and a modem processor. The application processor mainly processes the operating system, a user interface, an application, and the like. The modem processor mainly processes wireless communication. It may be understood that the modem processor may also not be integrated with the processor 35.

The smartphone further includes the power supply 36 (such as a battery) supplying power to each component. Preferably, the power supply may be logically connected to the processor 35 by using a power management system, so as to implement functions such as charge and discharge management and power consumption management by using the power management system.

The interface 37 may be configured to connect to another device, and transmit data between the smartphone and the another device.

Optionally, the smartphone may further include a Wireless Fidelity (wireless fidelity, WiFi) module not shown in FIG. 14, a Bluetooth module, or the like. Details are not further described herein in this embodiment of the present invention.

An embodiment of the present invention further provides a computer-readable storage medium. The computer-readable storage medium stores one or more programs, the one or more programs include a computer-executable instruction, and when at least one processor of an intelligent terminal executes the computer-executable instruction, the intelligent terminal performs the method for displaying a candidate word as shown in FIG. 4, FIG. 9, FIG. 11, or FIG. 12. For a specific method for displaying a candidate word, refer to the descriptions about the embodiment shown in FIG. 4, FIG. 9, FIG. 11, or FIG. 12. Details are not further described herein.

On one hand, when displaying a candidate word in a default candidate option area of an input method, the intelligent terminal provided by this embodiment of the present invention may refer to an application scenario of the input method, that is, by which type of application the input method is invoked, then determine corresponding dimension information according to the type of the application, and determine a lexicon corresponding to the dimension information, that is, the lexicon is a lexicon that matches the application scenario of the input method. Therefore, it may be ensured to some extent that candidate words determined from the lexicon may be words that a user needs to enter, and further, the candidate words are displayed in the default candidate option area of the input method. This can improve efficiency of the user in entering information by using the input method.

On the other hand, after the user copies a piece of content, the user may paste the copied content. Therefore, in this embodiment of the present invention, if the intelligent terminal provided by this embodiment of the present invention determines that content in a clipboard is updated, the intelligent terminal may display updated content in the clipboard in the default candidate option area of the input method (that is, display the updated content in the clipboard as at least one candidate word in the default candidate option area of the input method). Therefore, efficiency of the user in entering information by using the input method can be improved.

An embodiment of the present invention provides a graphical user interface (graphical user interface, GUI) on a computer device. The computer device has a display, a touch-sensitive surface, a memory, and one or more processors configured to execute one or more programs stored in the memory. The graphical user interface includes an application interface, an input box, and an input method interface.

On one hand, in response to detecting that a user triggers a first application, an application interface and a first input box of the first application are displayed; and in response to detecting that the user selects the first input box, a first input method interface is displayed, where a default candidate option area of the first input method interface includes a first group of default candidate words;

On the other hand, in response to detecting that the user triggers a second application, an application interface and a second input box of the second application are displayed; and in response to detecting that the user selects the second input box, a second input method interface is displayed, where a default candidate option area of the second input method interface includes a second group of default candidate words.

The first application and the second application are different applications, and the first group of default candidate words and the second group of default candidate words include different candidate words. A quantity of candidate words included in the first group of default candidate words is at least one, and a quantity of candidate words included in the second group of default candidate words is also at least one. That the first group of default candidate words and the second group of default candidate words include different candidate words may mean that the first group of default candidate words and the second group of default candidate words include at least one different candidate word, or that the included candidate words are all different.

Figure 15:
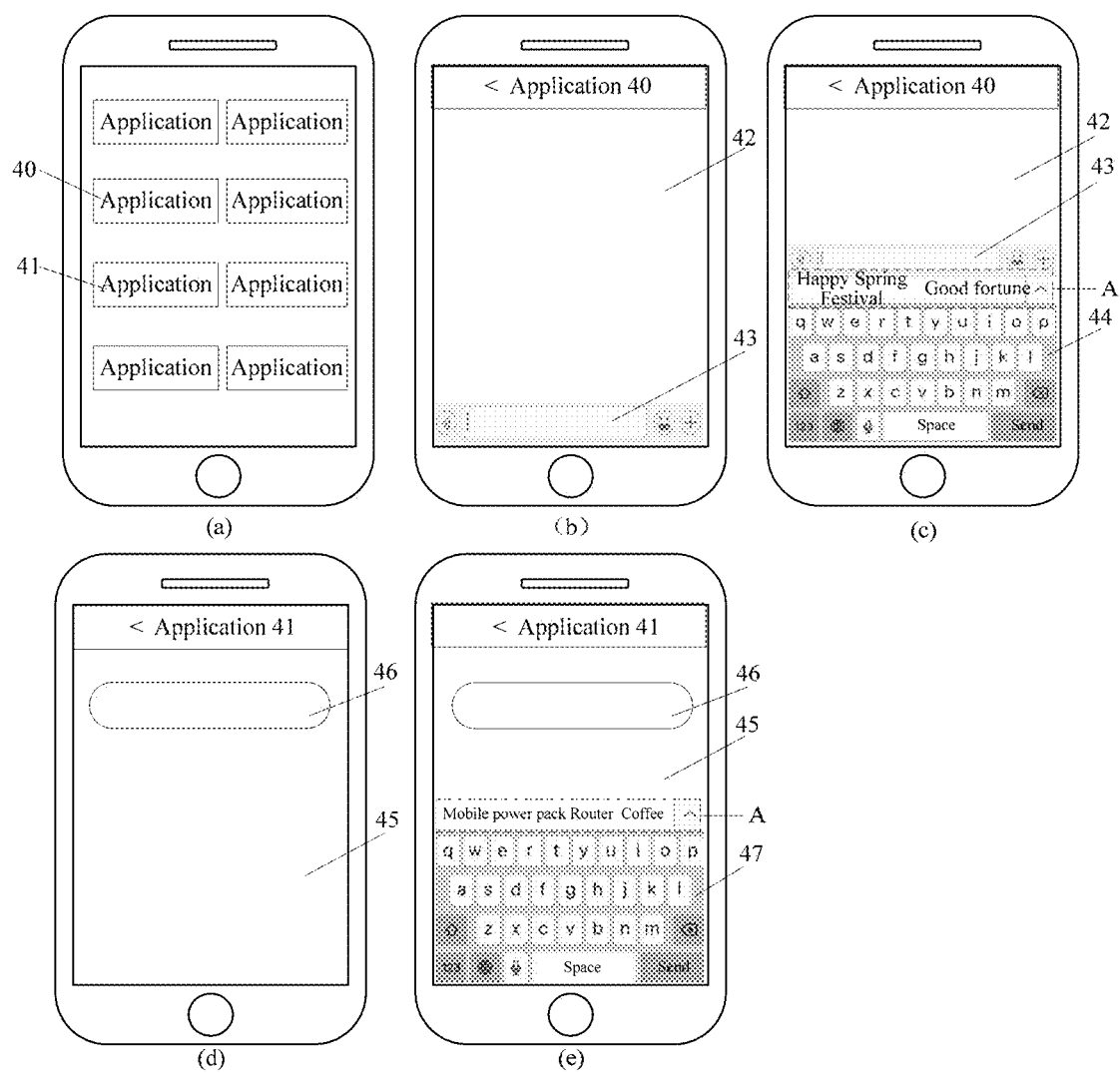
FIG. 15 is a schematic diagram 1 of a graphical user interface according to an embodiment of the present invention.

Detecting that the user triggers the first application or the second application may be accepting the user's touch on an APP icon to start an APP in the scenario shown in FIG. 15 (*a*), or may be another manner, for example, switching, by using a gesture, an APP running on a background to a screen for displaying. That the application interface and the first input box of the first application are displayed and that the application interface and the second input box of the second application are displayed may be specifically: the application interface and the first input box of the first application are not simultaneously displayed on the screen with the application interface and the second input box of the second application; or the application interface and the first input box of the first application, and the application interface and the second input box of the second application are displayed in a split-screen manner, for example, displayed on an upper half part and a lower half part of the screen respectively.

Detecting that the user selects the first input box or the second input box may be detecting that the user presses the first input box or the second input box on a touchscreen, so that the input method interface is activated to accept an input of the user.

Optionally, in this embodiment of the present invention, a type of the first application is a chat type, a map type, a commodity type, an audio/video type, or an application market type; and a type of the second application is the chat type, the map type, the commodity type, the audio/video type, or the application market type.

It may be understood that, in this embodiment of the present invention, the first application and the second application may be two different applications of a same application type. For example, the first application and the second application may be two different applications of the chat application type. The first application and the second application may also be two different applications of different application types. For example, the first application is an application of the chat application type, and the second application is an application of the map application type.

Optionally, the first group of default candidate words is updated content in a clipboard; and/or the second group of default candidate words is updated content in a clipboard. Specifically, for detailed descriptions about a default candidate word being updated content in the clipboard, refer to the foregoing related descriptions in the embodiments shown in FIG. 9 to FIG. 12. Details are not further described herein.

It should be noted that, the computer device in this embodiment may be the intelligent terminal in the foregoing embodiment. For example, the computer device may be the smartphone in the foregoing embodiment shown in FIG. 14; the display of the computer device may be the display unit 33 of the smartphone; the touch-sensitive surface of the computer device may be the touchscreen 321 of the smartphone; the memory and the processor of the computer device may be the memory 31 and the processor 32 of the smartphone.

In addition, the first group of default candidate words and the second group of default candidate words in this embodiment may be at least one candidate word displayed in the default candidate option area of the input method when the input method is invoked by applications of different types in the embodiments shown in FIG. 2 to FIG. 14.

Using FIG. 15 as an example, the following describes the graphical user interface provided by this embodiment of the present invention. FIG. 15 is described by using an example in which the computer device in this embodiment is an intelligent terminal.

FIG. 15 (*a*) shows a home page of the intelligent terminal. The home page includes thumbnail icons of multiple applications, and the multiple applications include a first application 40 and a second application 41. When the user triggers the first application 40 (for example, the user taps a thumbnail icon of the first application 40), as shown in FIG. 15 (*b*), the intelligent terminal detects that the user triggers the first application 40, and in response to the trigger, the intelligent terminal displays an application interface 42 and a first input box 43 of the first application 40 on the display.

When the user selects the first input box 43 (for example, the user taps the first input box 43), as shown in FIG. 15 (*c*), the intelligent terminal detects that the user selects the first input box 43, and in response to the selection, the intelligent terminal displays a first input method interface 44 (namely, an interface of a first input method, where the first input method is invoked by the first application so that the intelligent terminal displays the first input method interface 44) on the display. Default candidate option area A of the first input method interface 44 includes the first group of default candidate words, for example, "Happy Spring Festival" and "good fortune" shown in FIG. 15 (*c*). When the user triggers the second application 41 (for example, the user taps a thumbnail icon of the second application 41), as shown in FIG. 15 (*d*), the intelligent terminal detects that the user triggers the second application 41, and in response to the trigger, the intelligent terminal displays an application interface 45 and a second input box 46 of the second application 41 on the display. When the user selects the second input box 46 (for example, the user taps the second input box 46), as shown in FIG. 15 (*e*), the intelligent terminal detects that the user selects the second input box 46, and in response to the selection, the intelligent terminal displays a second input method interface 47 (namely, an interface of a second input method, where the second input method is invoked by the second application so that the intelligent terminal displays the second input method interface 47) on the display. Default candidate option area A of the second input method interface 47 includes the second group of default candidate words, for example, "mobile power pack", "router", and "coffee" shown in FIG. 15 (*e*).

It should be noted that, after the user triggers the first application 40 and selects the first input box 43 shown in FIG. 15, the user may first press a "Home" key (namely, the Home key) to return to the home page of the intelligent terminal, for example, as shown in FIG. 15 (*a*), and then the user triggers the second application 41 on the home page of the intelligent terminal to complete displaying of the application interface 45 and the second input box 46 of the second application 41.

Further, in this embodiment of the present invention, after the user triggers the first application, the display of the intelligent terminal may display the application interface, the first input box, and the first input method interface of the first application. After the user triggers the second application, the display of the intelligent terminal may display the application interface, the second input box, and the second input method interface of the second application while displaying the application interface, the first input box, and the first input method interface of the first application. That is, the application interface, the first input box, and the first input method interface of the first application, and the application interface, the second input box, and the second input method interface of the second application are displayed on one graphical user interface.

Certainly, in this embodiment of the present invention, after the user triggers the first application, the display of the intelligent terminal may display the application interface, the first input box, and the first input method interface of the first application. After the user triggers the second application, the display of the intelligent terminal may quit displaying the application interface, the first input box, and the first input method interface of the first application, and display the application interface, the second input box, and the second input method interface of the second application. That is, the application interface, the first input box, and the first input method interface of the first application are displayed on one graphical user interface; and the application interface, the second input box, and the second input method interface of the second application are displayed on another graphical user interface. Specifically, this may be determined according to an actual use requirement, and is not limited in the present invention.

It should be noted that, for a specific implementation in which the first group of default candidate words is the updated content in the clipboard and/or the second group of default candidate words is the updated content in the clipboard, it is only necessary to replace the default candidate words shown in FIG. 15 (*c*) and/or FIG. 15 (*e*) with the updated content in the clipboard. For a specific schematic display diagram, refer to the default candidate words shown in FIG. 15 (*c*) and/or FIG. 15 (*e*). Details are not further described herein.

On the graphical user interface provided by this embodiment of the present invention, when the user triggers different applications, because input method interfaces displayed when input boxes on different application interfaces are selected may include different default candidate words, it may be ensured to some extent that the default candidate words may be words that the user needs to enter in an input box; and further, the default candidate words are displayed in a default candidate option area of the input method. This can improve efficiency of the user in entering information by using the input method.

An embodiment of the present invention provides a graphical user interface on a computer device. The computer device has a display, a touch-sensitive surface, a memory, and one or more processors configured to execute one or more programs stored in the memory. The graphical user interface includes an application interface, an input box, and an input method interface.

In response to detecting that a user triggers content copying, copied content is selected and displayed;

in response to detecting that the user triggers an application, an application interface and an input box of the application are displayed; and in response to detecting that the user selects the input box, an input method interface is displayed, where a default candidate option area of the input method interface includes a group of default candidate words, and the group of default candidate words is the copied content.

In this embodiment, the copied content is temporarily stored in a clipboard in a specific implementation, that is, original content in the clipboard is replaced with the copied content. Therefore, the copied content is also the updated content in the clipboard.

For detailed descriptions about the application in this embodiment, refer to the descriptions about the application in each of the foregoing embodiments (including the foregoing method embodiments, apparatus embodiments, and graphical user interface embodiments). Details are not further described herein.

For detailed descriptions about the computer device, the display, the touch-sensitive surface, the memory, and the processor in this embodiment of the present invention, refer to related descriptions in the foregoing graphical user interface embodiment. Details are not further described herein.

In addition, the group of default candidate words in this embodiment may be at least one candidate word displayed in the default candidate option area of the input method when the input method is invoked by applications of different types in the embodiments shown in FIG. 2 to FIG. 14.

Figure 16:
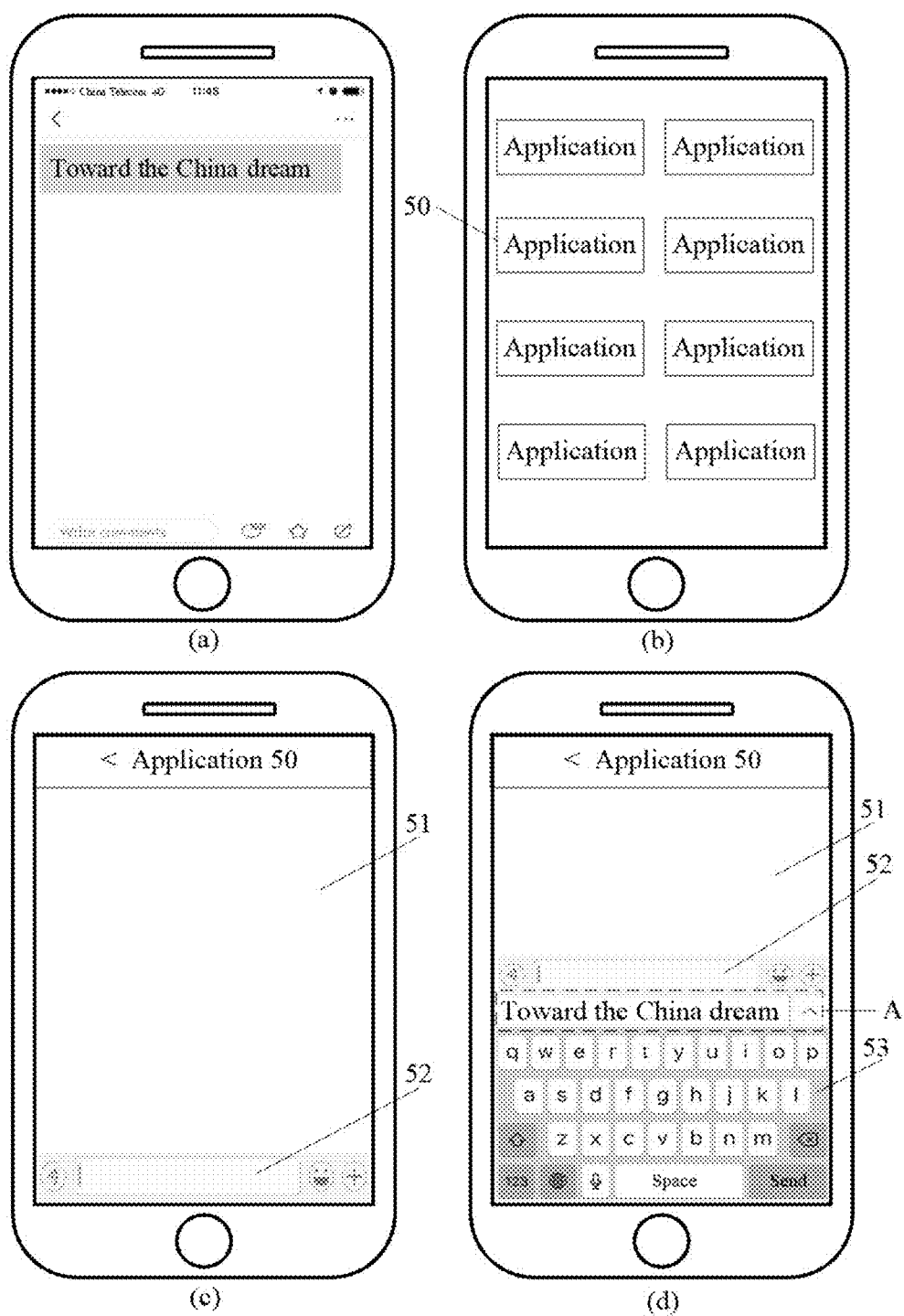
FIG. 16 is a schematic diagram 2 of a graphical user interface according to an embodiment of the present invention.

Using FIG. 16 as an example, the following describes the graphical user interface provided by this embodiment of the present invention. FIG. 16 is described by using an example in which the computer device in this embodiment is an intelligent terminal.

FIG. 16 (a) shows a display interface of the intelligent terminal. When the user triggers the intelligent terminal to copy a piece of content, for example, "Toward the China dream" shown in FIG. 16 (a), the intelligent terminal detects that the user triggers content copying, and in response to the trigger, the intelligent terminal selects and displays the copied content on the display (that is, the copied content is displayed in a manner of being selected; and in an internal implementation, the copied content may be temporarily stored in the clipboard, that is, the copied content is updated content in the clipboard). FIG. 16 (b) shows a home page of the intelligent terminal. The home page includes thumbnail icons of multiple applications, and the multiple applications include an application 50. When the user triggers the application 50 (for example, the user taps a thumbnail icon of the application 50), as shown in FIG. 16 (c), the intelligent terminal detects that the user triggers the application 50, and in response to the trigger, the intelligent terminal displays an application interface 51 and an input box 52 of the application 50 on the display. When the user selects the input box 52 (for example, the user taps the input box 52), as shown in FIG. 16 (d), the intelligent terminal detects that the user selects the input box 52, and in response to the selection, the intelligent terminal displays an input method interface 53 (that is, an interface of an input method, where the input method is invoked by the application 50 so that the intelligent terminal displays the input method interface 53) on the display. Default candidate option area A of the input method interface 53 includes a group of default candidate words, and the group of default candidate words is the content (that is, the content selected and displayed by the intelligent terminal) that the user triggers to copy as shown in FIG. 16 (a), for example, "Toward the China dream" shown in FIG. 16 (d).

It should be noted that, the content that the user triggers the intelligent terminal to copy may be the content that the user triggers the intelligent terminal to copy on the application interface of the application 50, or content that the user triggers the intelligent terminal to copy in any other case (for example, content that the user triggers the intelligent terminal to copy on an application interface of another application as shown in FIG. 16 (a)). This is not specifically limited in the present invention.

For example, as shown in FIG. 16 (a), after the user triggers the intelligent terminal to copy content on an application interface of another application different from the application 50, the user may first press a "Home" key (namely, the Home key) to return to the home page of the intelligent terminal, for example, as shown in FIG. 16 (b), and then the user triggers the application 50 on the home page of the intelligent terminal to complete displaying of the application interface and the input box of the application 50.

In this embodiment of the present invention, after the user triggers the intelligent terminal to perform copying, when the user triggers an application for the first time and selects an input box on an application interface of the application, a default candidate option area of an input method interface displayed by the intelligent terminal includes content copied by the intelligent terminal (that is, the default candidate option area of the input method interface displayed for the first time includes updated content only after content in the clipboard is updated).

On the graphical user interface provided by this embodiment of the present invention, after the user triggers the intelligent terminal to copy a piece of content, the user may continue to trigger the intelligent terminal to paste the copied content. Therefore, in this embodiment of the present invention, after the user triggers the intelligent terminal to perform copying, when the user triggers an application, because an input method interface displayed when an input box on an application interface of the application is selected may include the content that the user triggers the intelligent terminal to copy, the content that the user triggers the intelligent terminal to copy is displayed in a default candidate option area of the input method. This can improve efficiency of the user in entering information by using the input method.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An electronic device, comprising:
    a display;
    at least one processor; and
    at least one memory, the at least one memory comprising instructions that when executed by the at least one processor, cause the electronic device to perform, at least, the following:
        in response to detecting a first operation in a first application, displaying a first application interface of the first application, a first input box being shown as empty, a first input method interface, and a first candidate option area that comprises first candidate options; and
        in response to detecting a second operation in a second application being different from the first application, displaying a second application interface of the second application, a second input box being shown as empty, a second input method interface, and a second candidate option area that comprises second candidate options,
        wherein the first input method interface and the second input method interface are displayed by a same input method application, and the first candidate options are different from the second candidate options,
        wherein the first candidate options are displayed before a user inputs information to the first input box, and the second candidate options are displayed before a user inputs information to the second input box,
        wherein the second candidate options comprise a group of emoticons, and
        wherein the first candidate options comprise a group of words.

2. The electronic device of claim 1, wherein the first application is a chat type and the second application is the chat type.

3. The electronic device of claim 1, wherein before a user starts to enter information, the candidate option area is referred to as a default candidate option area.

4. The electronic device of claim 1, wherein the first candidate options comprise updated content in a clipboard and/or the second candidate options comprise updated content in a clipboard.

5. The electronic device of claim 2, wherein according to the type of the first application, dimension information was determined corresponding to the type of the application, wherein the dimension information includes metadata information regarding the type of the application, and wherein according to the dimension information, a lexicon was determined corresponding to the dimension information.

6. The electronic device of claim 5, wherein either a) the type of the application is a chat type, the dimension information is a date dimension, the lexicon is a date lexicon corresponding to the date dimension, and at least one candidate word meets a following preset condition: the at least one candidate word is in the date lexicon and corresponds to a first date, wherein the first date is a date that is in the date lexicon and the same as a current date; or
    b) the type is a chat type, the dimension information is a date dimension and a chat object dimension, the lexicon is a date lexicon corresponding to the date dimension and a chat object lexicon corresponding to the chat object dimension, and the at least one candidate word meets a following preset condition: the at least one candidate word is in the date lexicon and corresponds to a first date, wherein the first date is a date that is in the date lexicon and the same as a current date, a binding relationship exists between the first date and a first relationship, and a relationship between a user and an object currently chatting with the user is the first relationship in the chat object lexicon.

7. The electronic device of claim 6, wherein the type is a map type, the dimension information is a historical record dimension, the lexicon is a historical record lexicon corresponding to the historical record dimension, and the at least one candidate word meets a following preset condition: the at least one candidate word is in the historical record lexicon and corresponds to first latitude and longitude, wherein the first latitude and longitude are latitude and longitude in the historical record lexicon and are the same as latitude and longitude of a current location of the user.

8. The electronic device of claim 7, wherein the type is a commodity type, an audio/video type, or an application market type, the dimension information is a historical record dimension and a search popularity dimension, the lexicon is a historical record lexicon corresponding to the historical record dimension and a search popularity lexicon corresponding to the search popularity dimension, and the at least one candidate word meets a following preset condition: the at least one candidate word is in the historical record lexicon and the search popularity lexicon, and a search frequency of the at least one candidate word is highest in the lexicon, and a last search date of the at least one candidate word is closest to a current date.

9. A non-transitory computer-readable storage medium comprising instructions which, when executed by an electronic device, cause the electronic device to carry out the following:
    in response to detecting an operation in a first application, displaying a first application interface of the first application, a first input box being shown as empty, a first input method interface, and a first candidate option area that comprises first candidate options; and
    in response to detecting an operation in a second application being different from the first application, displaying a second application interface of the second application, a second input box being shown as empty, a second input method interface, and a second candidate option area that comprises second candidate options,
    wherein the first input method interface and the second input method interface are displayed by a same input method application, and the first candidate options are different from the second candidate options,
    wherein the first candidate options are displayed before a user inputs information to the first input box, and the second candidate options are displayed before a user inputs information to the second input box,
    wherein the second candidate options comprise a group of emoticons, and
    wherein the first candidate options comprise a group of words.

10. The non-transitory computer-readable storage medium of claim 9, wherein a type of the first application is a chat type and a type of the second application is the chat type.

11. The non-transitory computer-readable storage medium of claim 9, wherein the first candidate options comprise updated content in a clipboard and/or the second candidate options comprise updated content in a clipboard.

12. The non-transitory computer-readable storage medium of claim 9, wherein the first candidate options comprise a group of words.

13. The non-transitory computer-readable storage medium of claim 9, wherein before a user starts to enter information, the candidate option area is referred to as a default candidate option area.

14. The non-transitory computer-readable storage medium of claim 9, wherein according to a type of the first application, dimension information was determined corresponding to the type of the application, wherein the dimension information includes metadata information regarding the type of the application, and wherein according to the dimension information, a lexicon was determined corresponding to the dimension information.

15. A graphical user interface on a computer device, wherein the computer device has a display, a touch-sensitive surface, a memory, and one or more processors configured to execute one or more programs stored in the memory, and the graphical user interface comprises an application interface, an input box, and an input method interface, wherein the graphical user interface is configured to:

display, in response to detecting that a user triggers a first application, a first application interface, a first input method interface, a first default candidate option area, and a first input box, wherein the first default candidate option area comprises a first group of default candidate options; and display, in response to detecting that the user triggers a second application, a second application interface, a second input method interface, a second default candidate option area, and a second input box, wherein the second default candidate option area comprises a second group of default candidate options, wherein the first application and the second application are different applications, and the first group of default candidate options and the second group of default candidate options comprise different candidate options.

16. The graphical user interface of claim 15, wherein a type of the first application is a chat type, a map type, a commodity type, an audio/video type, or an application market type, and wherein a type of the second application is the chat type, the map type, the commodity type, the audio/video type, or the application market type.

17. The graphical user interface of claim 15, wherein the first group of default candidate options comprises updated content in a clipboard and/or the second group of default candidate options comprises updated content in a clipboard.

18. The graphical user interface of claim 15, wherein in response to a user inputted character string in the first input box or the second input box, the first candidate option area or the second candidate option area displays at least one of words or phrases corresponding to the character string.

19. The graphical user interface of claim 15, wherein the first input box is shown as empty.

20. The graphical user interface according to claim 15, wherein the second input box is shown as empty.

* * * * *

UNITED STATES PATENT AND TRADEMARK OFFICE
CERTIFICATE OF CORRECTION

| | | |
|---|---|---|
| PATENT NO. | : 11,755,835 B2 | Page 1 of 1 |
| APPLICATION NO. | : 17/144149 | |
| DATED | : September 12, 2023 | |
| INVENTOR(S) | : Weibin Zheng and Yue Zhang | |

It is certified that error appears in the above-identified patent and that said Letters Patent is hereby corrected as shown below:

On the Title Page

Page 2, item [56], insert:
--2002/0126097 A1 09/2002 Savolainen
2005/0198023 A1 09/2005 James et al.
2005/0288920 A1 12/2005 Green et al.
2011/0022393 A1 01/2011 Waller et al.--

Signed and Sealed this
Twenty-first Day of November, 2023

Katherine Kelly Vidal
*Director of the United States Patent and Trademark Office*